(12) United States Patent
Juarez

(10) Patent No.: US 10,320,272 B1
(45) Date of Patent: Jun. 11, 2019

(54) MAGNET POWERED ELECTRIC GENERATOR

(71) Applicant: Michael A. Juarez, Tucson, AZ (US)

(72) Inventor: Michael A. Juarez, Tucson, AZ (US)

( * ) Notice: Subject to any disclaimer, the term of this patent is extended or adjusted under 35 U.S.C. 154(b) by 0 days.

(21) Appl. No.: 16/032,277

(22) Filed: Jul. 11, 2018

(51) Int. Cl.
| H02K 21/12 | (2006.01) |
| H02K 21/14 | (2006.01) |
| H02J 7/32 | (2006.01) |
| H02K 1/27 | (2006.01) |
| H02K 1/26 | (2006.01) |
| H02K 53/00 | (2006.01) |

(52) U.S. Cl.
CPC ............. H02K 21/14 (2013.01); H02J 7/32 (2013.01); H02K 1/26 (2013.01); H02K 1/2706 (2013.01); H02K 53/00 (2013.01)

(58) Field of Classification Search
CPC .......... H02K 21/14; H02K 53/00; H02K 1/26; H02K 1/2706; H02J 7/32
USPC .................................. 310/112–114, 179–210
See application file for complete search history.

(56) References Cited

U.S. PATENT DOCUMENTS

| 5,195,877 | A | * | 3/1993 | Kletschka | ............. | A61M 1/101 |
| | | | | | | 415/900 |
| 5,470,208 | A | * | 11/1995 | Kletschka | ............. | F04D 5/001 |
| | | | | | | 415/900 |
| 5,925,956 | A | * | 7/1999 | Ohzeki | .................... | F16C 29/00 |
| | | | | | | 310/12.06 |
| 2009/0121571 | A1 | * | 5/2009 | Onuma | ................. | F04D 29/058 |
| | | | | | | 310/90.5 |
| 2009/0134838 | A1 | * | 5/2009 | Raghuprasad | ............ | H02J 7/32 |
| | | | | | | 320/108 |
| 2010/0156219 | A1 | * | 6/2010 | Wang | .................. | F16C 32/0465 |
| | | | | | | 310/90.5 |
| 2010/0219709 | A1 | * | 9/2010 | Raghuprasad | ............ | H02J 7/32 |
| | | | | | | 310/156.01 |

* cited by examiner

*Primary Examiner* — Naishadh N Desai
(74) *Attorney, Agent, or Firm* — Dale J. Ream

(57) ABSTRACT

A self-powered magnetic generator includes first and second end stationary case assemblies having stationary levitation magnet members having north polarities. The generator includes a rotating assembly in operable communication with the case assemblies. Opposed ends of the rotating assembly includes rotating levitation magnet members, each of the rotating levitation magnet members having a north polarity so as to levitate by same polarities. The generator includes rotational magnets extending away from an outer surface of the rotating assembly between the first and second ends thereof. A center stationary case assembly includes a ring-shaped configuration defining a bore through which the rotating assembly extends. A plurality of center magnets is aligned with the plurality of rotational magnets of the rotating assembly that include polarities matching that of the rotational magnets, respectively, causing the rotating assembly to rotate axially by repelling forces. Corresponding power magnets generate electricity upon rotation thereof.

16 Claims, 27 Drawing Sheets

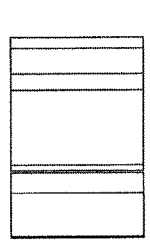
 ← 70
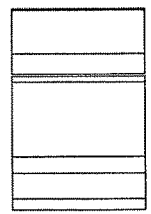
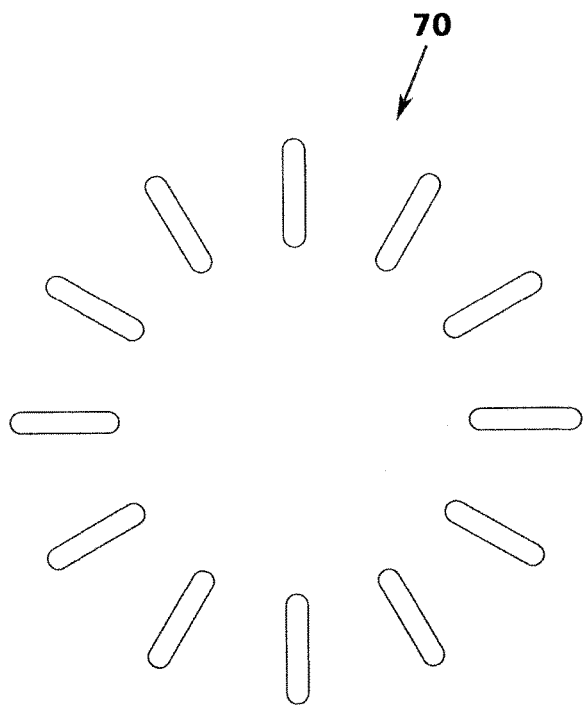
Fig.8             Fig.9

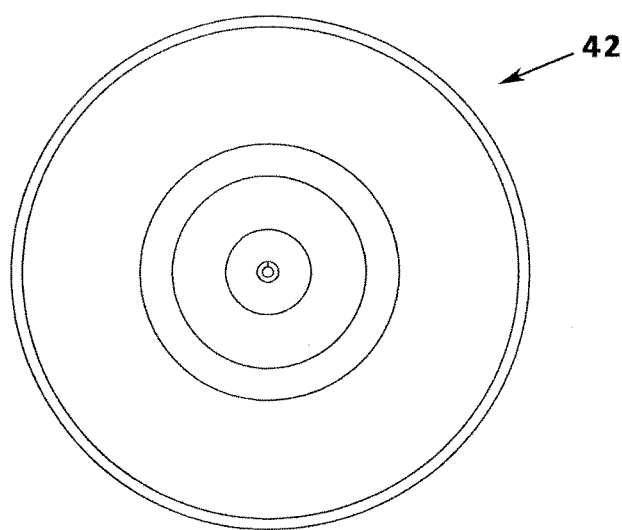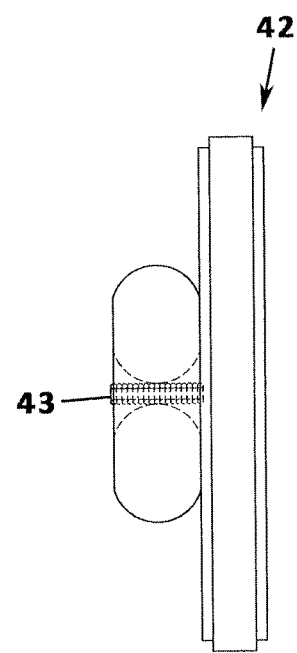
Fig.22a
Fig.22b

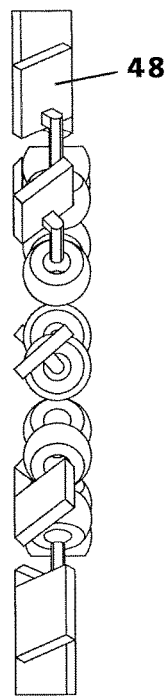
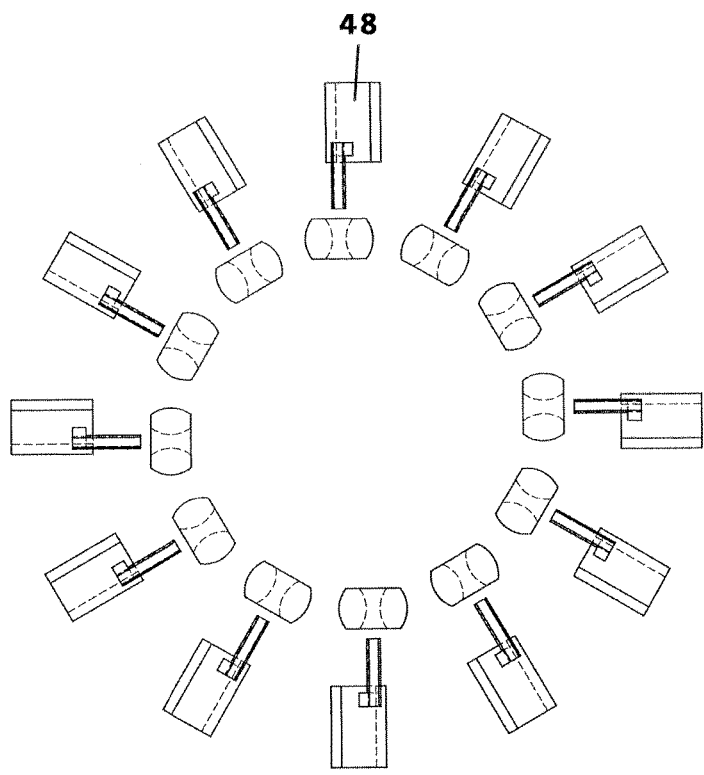
Fig24a
Fig24b

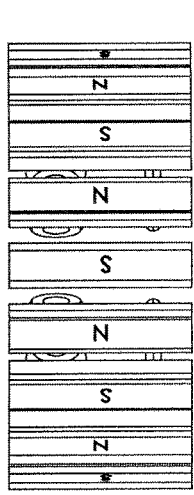
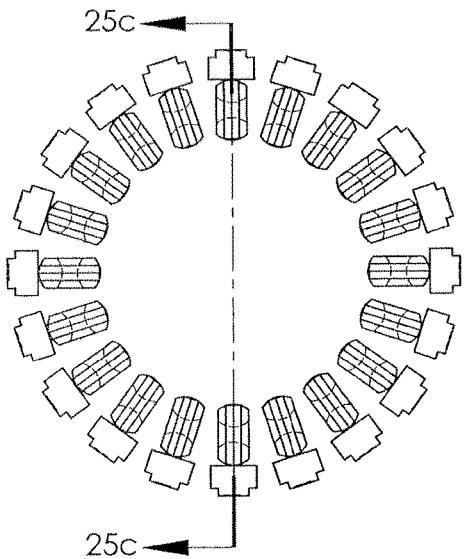
Fig.25a
Fig25b
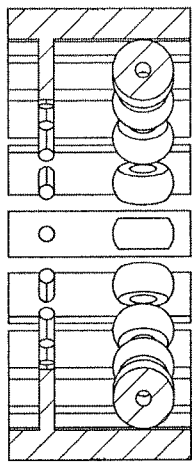
Fig.25c

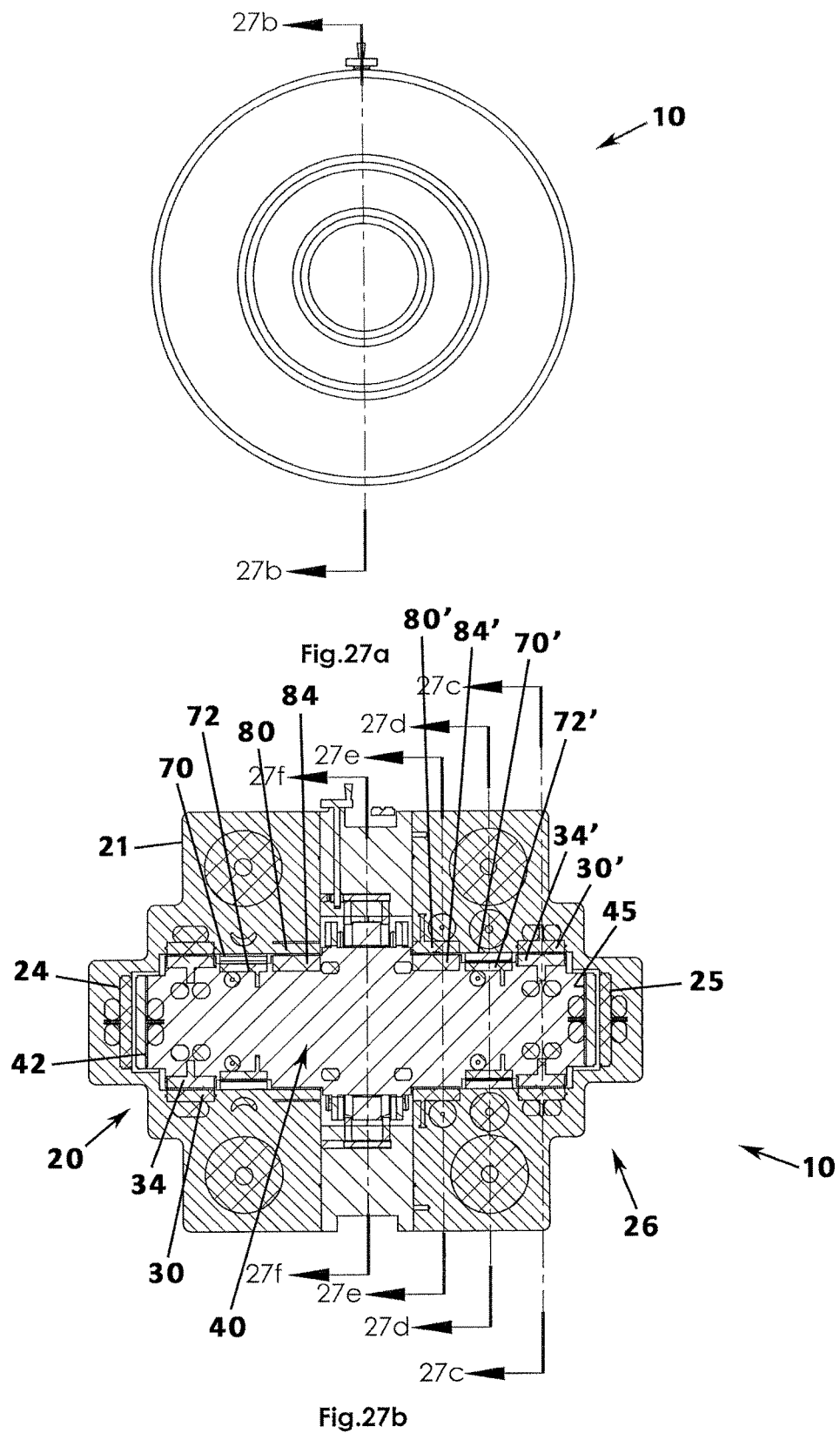

US 10,320,272 B1

MAGNET POWERED ELECTRIC GENERATOR

BACKGROUND OF THE INVENTION

This invention relates generally to electricity generators and, more particularly, to an electricity generator that uses magnets to operate a generator efficiently. In other words, the arrangement of magnet polarities generates rotation without with less friction and while also generating electricity.

Portable generators are often utilized to supply electricity to a house or business when normal AC power is interrupted, such as when electricity is knocked out by a storm. Having an electric generator is important for small businesses who would be harmed if electricity is lost for more than a few hours, such as hospitals, banks, and other suppliers of critical services. Electricity generators are also important for residents in harsh climates, such as areas of extreme cold or heat. Typical electric generators use gasoline or solar energy as a power source to then interact a wire and magnet to generate electricity. In a generator, coils of copper wire rotate between the poles of a magnet to produce a steady current of electricity. Rotation of the coils relative to the magnets may be done through manual cranking, by using the natural motion of running water, the flow of wind through a turbine, and the like.

Although presumably effective for their intended purposes, the existing generators and proposals still experience friction that decreases the maximum production of electricity or use power sources that are unreliable (e.g. wind) or require diversion of resources (e.g. water).

Therefore, it would be desirable to have a magnet powered electrical generator that uses the polarities of magnets to reduce frictional inefficiencies, cause rotation of a shaft, and to generate electricity as a power source usable to power electrical devices. Further, it would be desirable to have a magnet powered electrical generator in which a rotating assembly is held in alignment and caused to rotate by same-polarity magnets so as to reduce friction from rotation. In addition, it would be desirable to have a magnet powered electrical generator that includes a controller that uses magnet covers or shields that cause the generator to start and stop, when actuated.

SUMMARY OF THE INVENTION

A magnetic generator according to the present invention includes a first end stationary case assembly that includes a first housing defining an entrance channel and that includes a first plurality of stationary levitation magnet members positioned radially about the entrance channel, each of the first plurality of stationary levitation magnet members of the first end stationary case assembly having a north polarity. The generator includes a rotating assembly that includes a casing having a first end in operable communication with the entrance channel of the first housing of the first stationary case assembly and a second end opposite the first end. The first end of the rotating assembly includes a first plurality of rotating levitation magnet members positioned inside the casing, each one of the first plurality of rotating levitation magnet members having a north polarity. The first plurality of rotating levitation magnet members is aligned with and adjacent to the first plurality of stationary levitation magnet members, respectively, so that the first end of the rotating assembly is held in a magnetically induced levitation position relative to the entrance channel of the first housing. The generator includes a plurality of rotational magnets extending away from an outer surface of the rotating assembly between the first and second ends thereof.

The generator includes a center stationary case assembly that includes a center case housing having a ring-shaped configuration defining an interior area and having an inner surface defining an axial throughbore through which the casing of the rotating assembly extends, the inner surface defining a plurality of spaced apart windows. A plurality of center magnets is spaced apart along the inner surface adjacent the plurality of windows, respectively, and that are aligned with the plurality of rotational magnets of the rotating assembly. Each center magnet includes a polarity matching that of the plurality of rotational magnets, respectively, such that the rotating assembly is caused to rotate axially by a repelling force caused by proximate contact of the plurality of rotational magnets and the plurality of center magnets.

Therefore, a general object of this invention is to provide a magnet operated generator to generate exponential volumes of electricity with reduced power inefficiency or ongoing cost.

Another object of this invention is to provide a magnet operated generator having a rotating assembly that acts as a rotating shaft and that is held in levitational alignment by the repelling forces of like-polarity magnets.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b of FIG. 4a;

FIG. 5b is a side view of the end stationary case of FIG. 5a;

FIG. 5c is an end view of the end stationary case of FIG. 5a;

FIG. 6b is a side view of the stationary levitation magnet member shown in FIG. 6a;

FIG. 7b is a side view of the auxiliary stationary levitation magnet member shown in FIG. 7a;

FIG. 8 is a side view of coils of a power generation assembly associated with the end stationary case;

FIG. 9 is an end view of the coils as in FIG. 8;

FIG. 10b is a side view of the plurality of toroidal transformers as in FIG. 10a;

FIG. 11b is a side view of the another power generation assembly as in FIG. 11a;

FIG. 19b is a sectional view taken along line 19b-19b of FIG. 19a;

FIG. 22a is an end view of the rotating assembly as in FIG. 21, illustrating one of a first plurality of rotating levitation magnets;

FIG. 22b is side view of the levitation rotational magnet as in FIG. 22a;

FIG. 23b is a side view of the second plurality of levitation rotational magnets as in FIG. 23a;

FIG. 24a is a isolated top view of a plurality of rotational magnets of the rotating assembly as in FIG. 20;

FIG. 24b is a side view of the plurality of rotational magnets as in FIG. 24a'

FIG. 25a is an isolated top view of a plurality of power generating magnets taken from the rotating assembly shown in FIG. 20;

FIG. 25b is a side view of the plurality of auxiliary power generating magnets as in FIG. 25a;

FIG. 25c is a sectional view taken along line 25c-25c of FIG. 25b;

FIG. 26a is an isolated top view of a plurality of coils taken from the rotating assembly of FIG. 20;

FIG. 26b is a side view of the coils as in FIG. 26a;

FIG. 27a is an end view of the magnet driven electricity generator as in FIG. 1;

FIG. 27b is a sectional view taken along line 27b-27b of FIG. 27a;

DESCRIPTION OF THE PREFERRED EMBODIMENT

Figure 1:
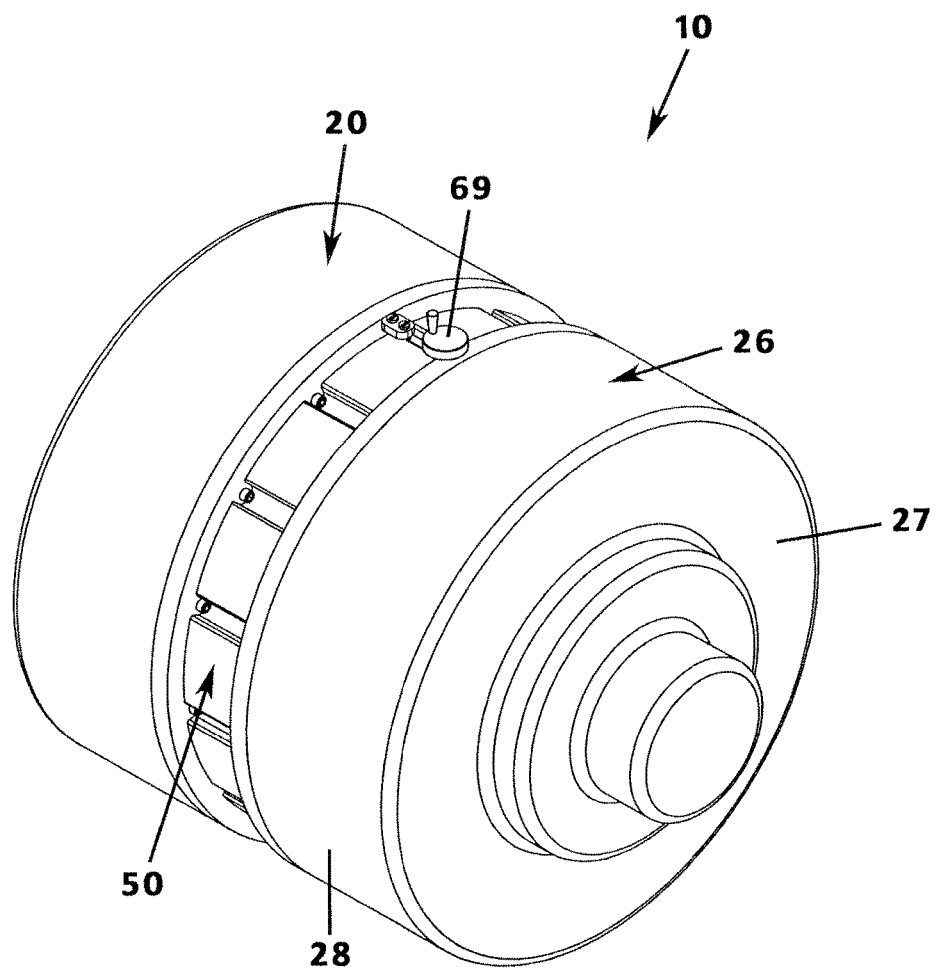
FIG. 1 is a perspective view of a magnet driven electricity generator according to a preferred embodiment of the present invention, illustrated in an operational configuration.

A self-powered magnetic generator according to a preferred embodiment of the present invention will now be described in detail with reference to FIGS. 1 to 27f of the accompanying drawings. The self-powered magnetic generator 10 includes a first end stationary case assembly 20, a second end stationary case assembly 26, a rotating assembly 40 having opposed ends operably coupled to the first end stationary case assembly 20 and to the second end stationary case assembly 26, respectively, and a center stationary case assembly 50.

FIG. 1 shows the self-powered magnetic generator 10 in which the stationary components are bolted together for operation. More particularly, the center stationary case assembly 50 is sandwiched between the first and second end stationary case assemblies 20, 26 and the rotating assembly 40 is positioned inside a collective interior area defined thereby as will be described below. It will be understood that respective end stationary case assemblies 20, 26 and the rotating assembly 40 are sealed in a vacuum, such that frictional losses resulting from rotation in ambient air are reduced markedly or eliminated.

The stationary end assemblies have substantially the same construction and configuration and are mirror images of one another. However, the specification and claims may still refer specifically to a first end stationary case assembly 20 and a second end stationary case assembly 26 and similarly make use of the words "first" and "second" so as to distinguish one assembly over the other as will become clear from the descriptions below.

Specifically, the first end stationary case assembly 20 includes a first housing having a closed outer end wall 21, an interior wall 22 opposite said outer end wall 21, a continuous side wall 21a extending between said outer end wall 21 and said interior wall 22, and defines an interior area. The interior wall 22 defines an opening to an entrance channel 23 into which a respective end of the rotating assembly 40 will be received as will be described later. The entrance channel 23 includes a generally cylindrical or tubular configuration about which various magnet assemblies are positioned. Where no additional structures are shown or described for mounting various magnet assemblies, it will be understood that the structures or assemblies may be embedded in the plastic molded material of the first housing itself. The entrance channel 23 gives access to the interior area defined by a respective stationary end case assembly.

Figure 5A:
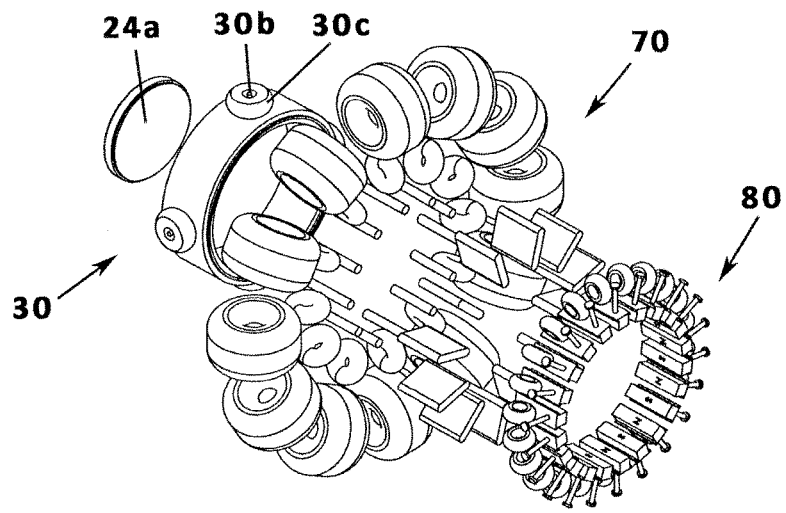
FIG. 5a is a perspective view of the end stationary case as in FIG. 4a illustrated with an outer casing removed.
Figures 5B, 5C:
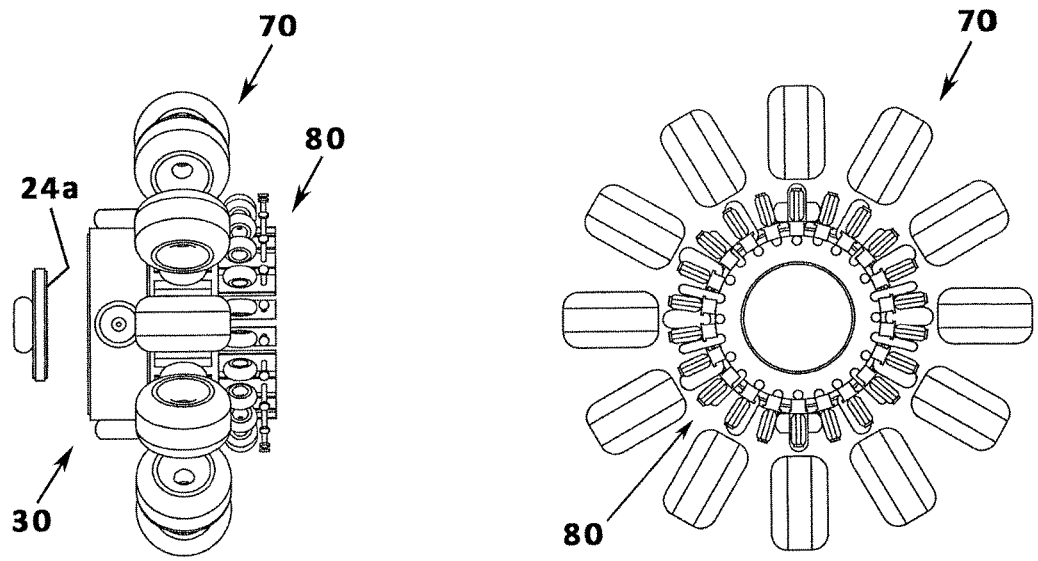
Figure 6A:
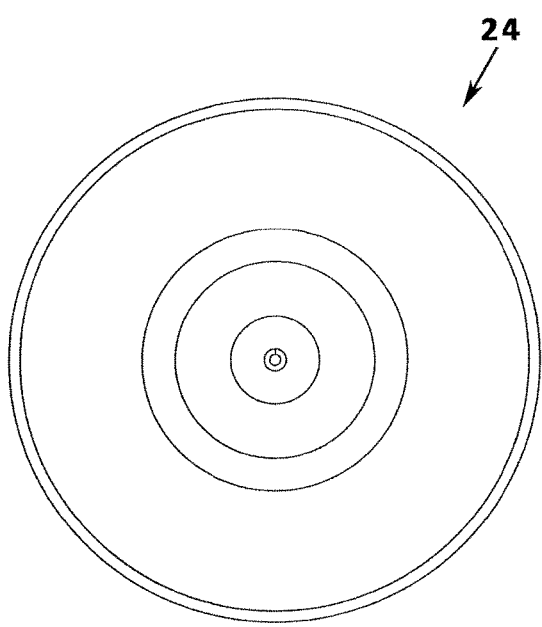
FIG. 6a is a front view of a first stationary levitation magnet member.
Figure 6B:
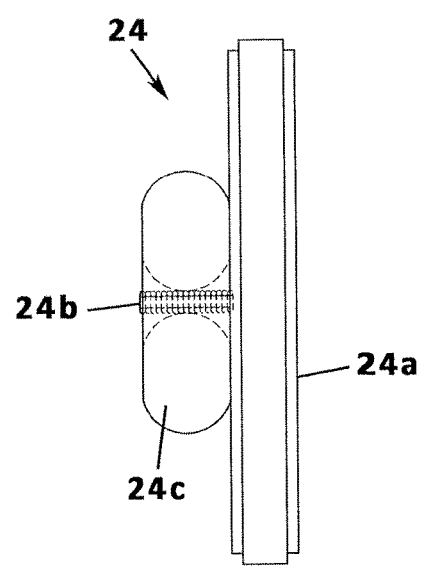
Figure 7A:
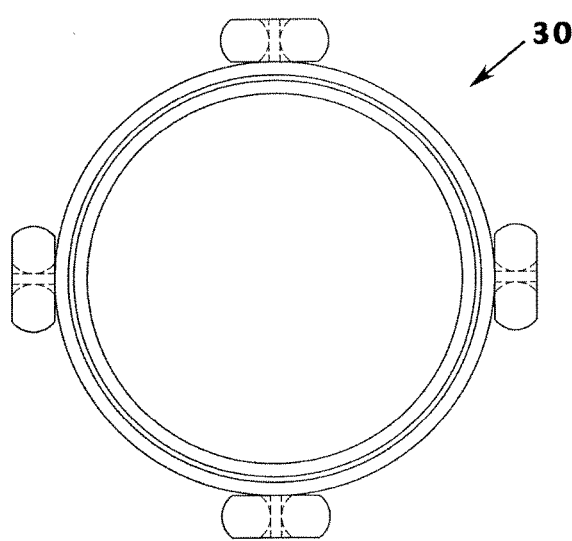
FIG. 7a is a front view of an auxiliary stationary levitation magnet member.
Figure 7B:
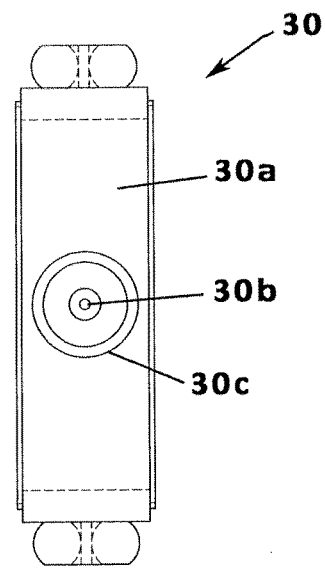
Figure 10A:
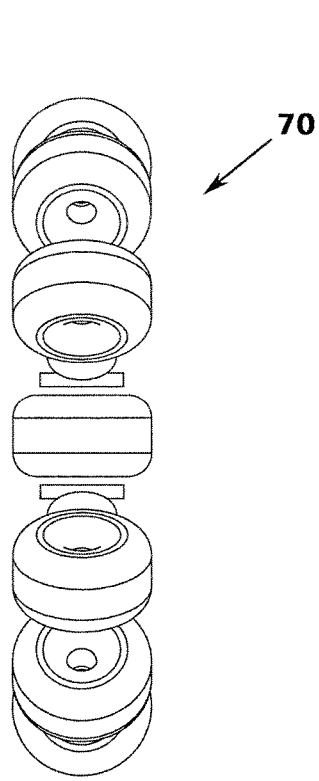
FIG. 10a is an end view of a plurality of toroidal transformers associated with a power generation assembly associated with the end stationary case.
Figure 10B:
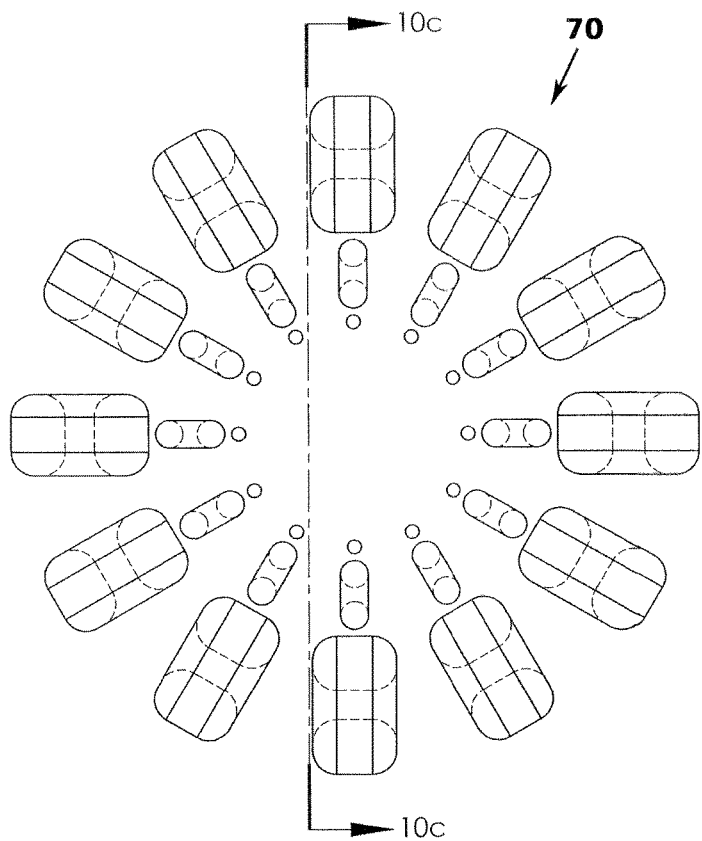
Figure 10C:
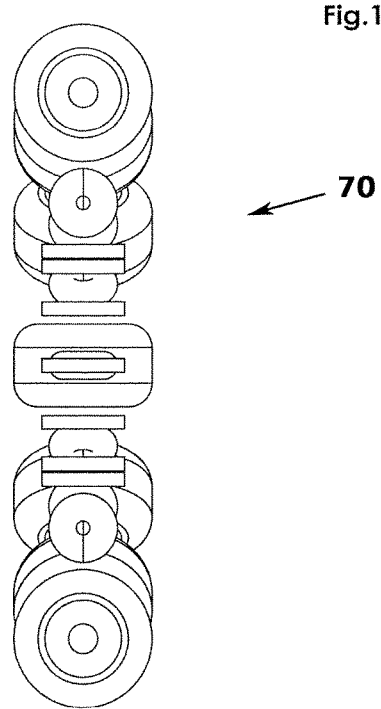
FIG. 10c is a sectional view taken along line 10c-10c of FIG. 10c.
Figure 11A:
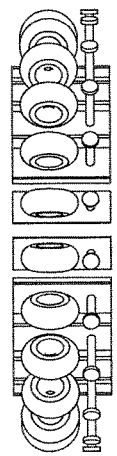
FIG. 11a is an end view of another power generation assembly associated with an end stationary case
Figure 11B:
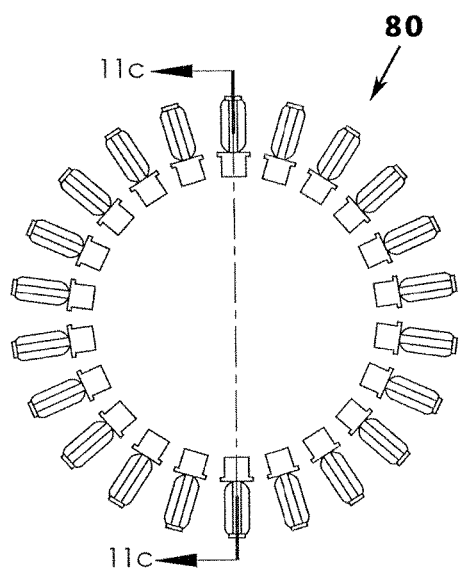
Figure 11C:
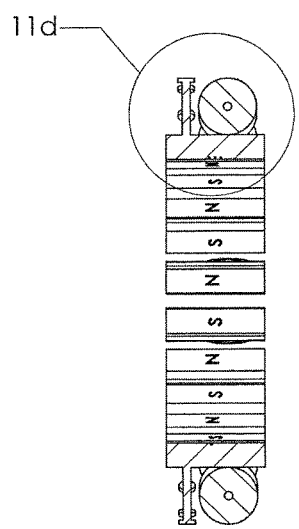
FIG. 11c is a sectional view taken along line 11c-11c of FIG. 11b.
Figure 11D:
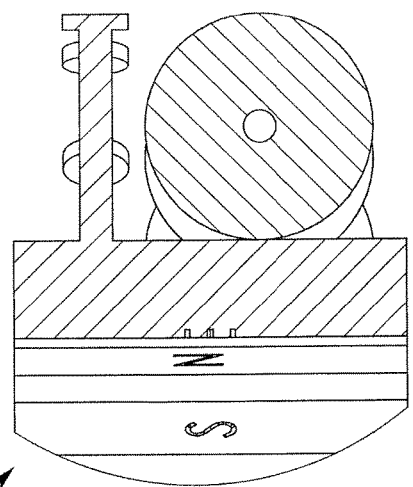
FIG. 11d is an isolated view on an enlarged scale taken from FIG. 11c.

A first plurality of stationary levitation magnet members 24 are positioned and spaced apart in a radial arrangement about the entrance channel 23 (FIG. 5a). Each magnet of the first plurality of stationary levitation magnet members has the same magnetic polarity, such a "north" polarity.

Figure 2:
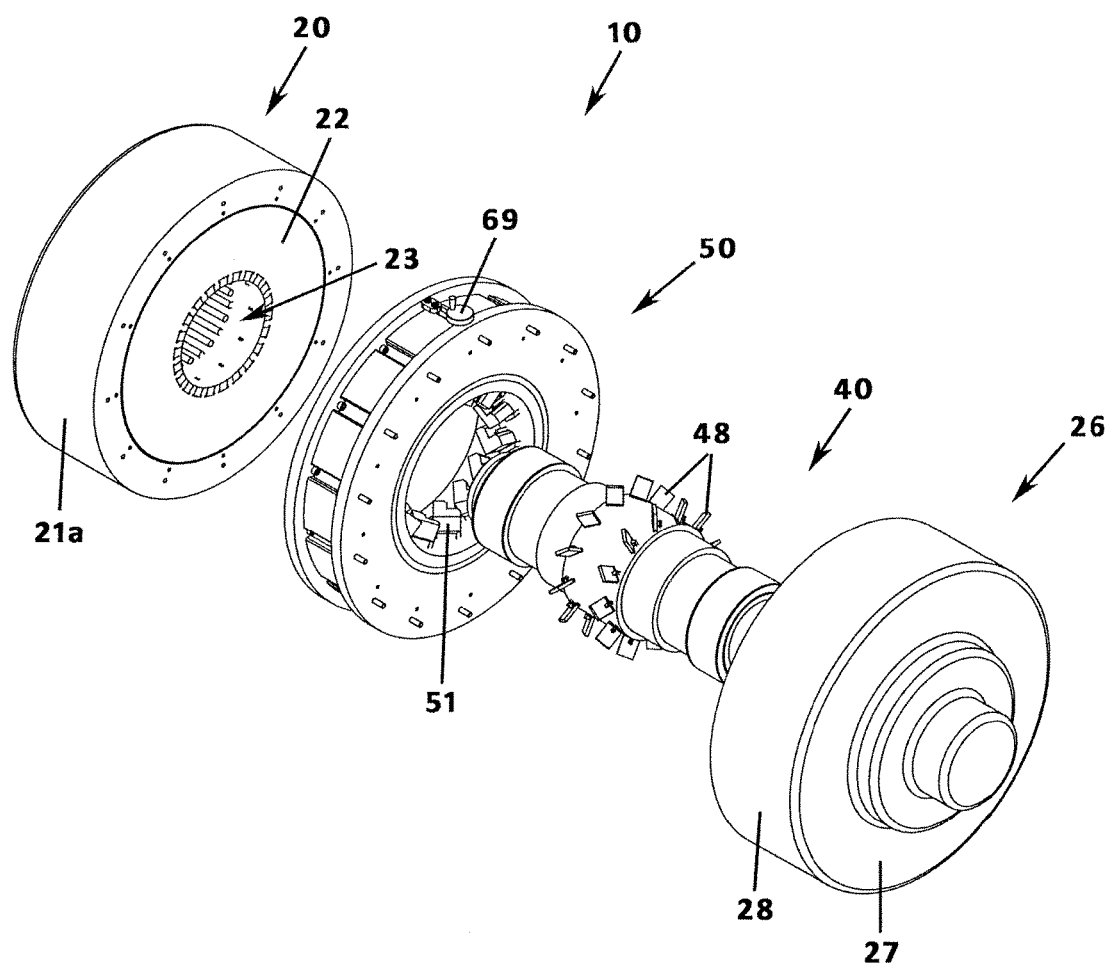
FIG. 2 is an exploded view of the generator as in FIG. 1.
Figure 3:
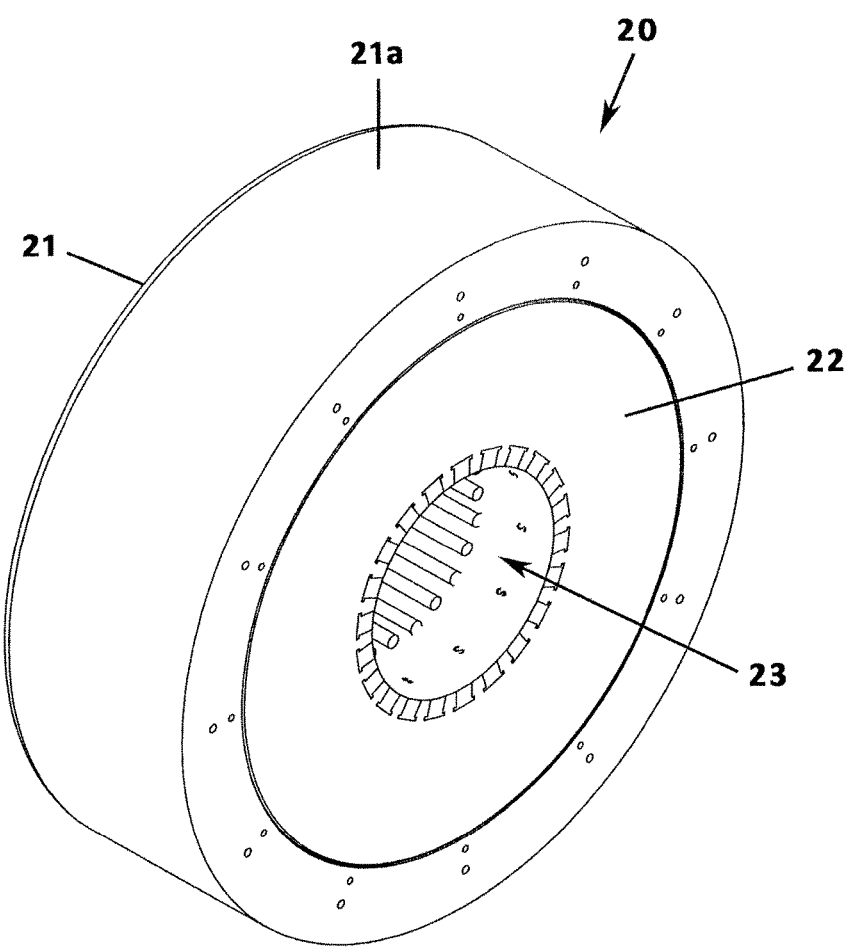
FIG. 3 an isolated perspective view of an end stationary case removed from the generator for clarity.

Referring now to the rotating assembly 40 so as to describe elements which correspond to those described above, the rotating assembly 40 includes a casing having a first end 41 operably received into the entrance channel 23 of the first end stationary case assembly 20 as shown in FIG. 2 (also referred to as simply the first end of the rotating assembly). The casing of the rotating assembly 40 includes a second end 44 opposite the first end 41, the second end 44 being received into the entrance channel of the second end stationary case assembly 26. The first end 41 of the rotating assembly 40 includes a first plurality of rotating levitation magnet members 42 positioned inside the casing of the rotating assembly 40, each one of the first plurality of rotating levitation magnet members 42 having the same polarity and that is the same polarity as each one of the first plurality of stationary levitation magnet members 24, e.g. a north polarity.

Figure 20:
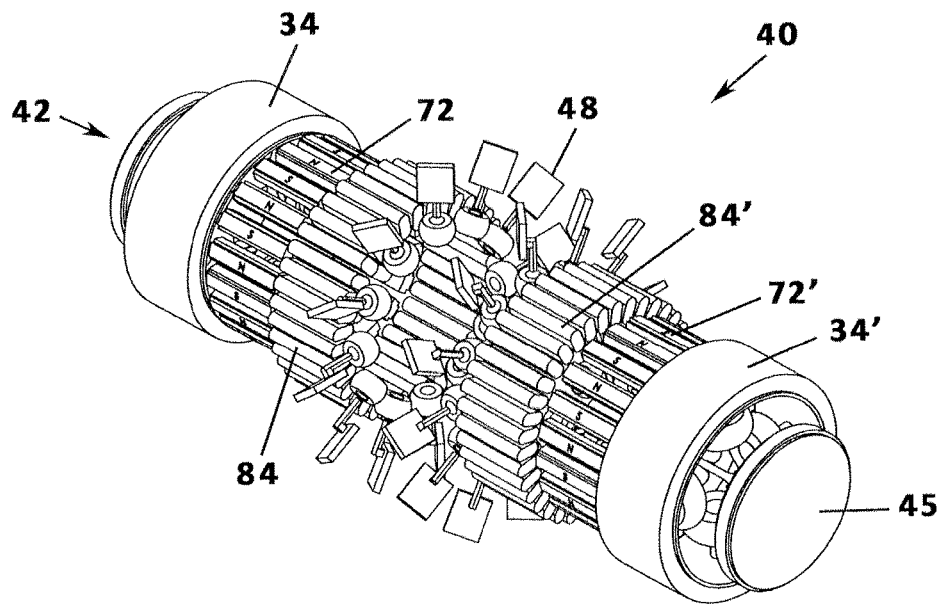
FIG. 20 is a perspective view of the rotating assembly as in FIG. 18 with the outer casing thereof removed for clarity.
Figure 21:
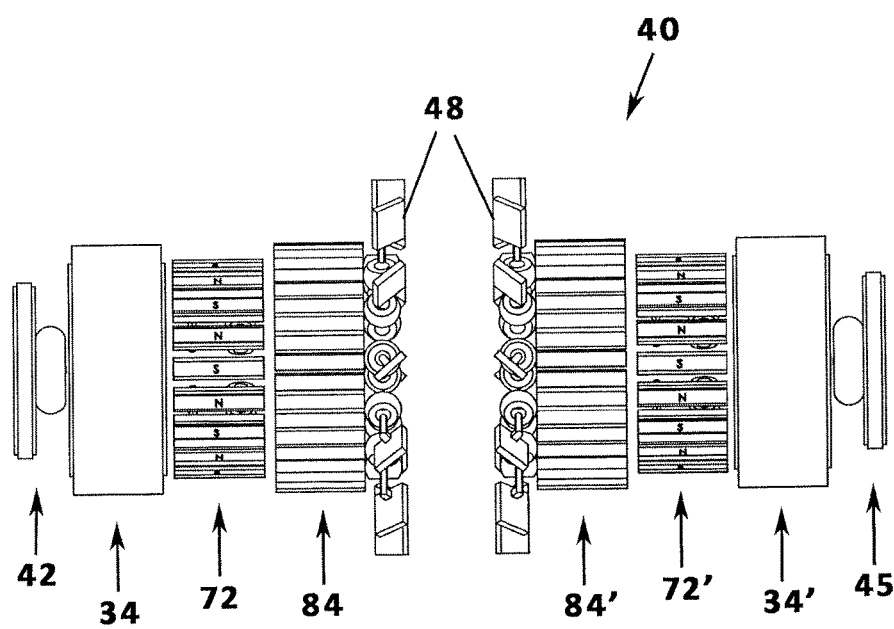
FIG. 21 is a side view of the rotating assembly as in FIG. 20 and illustrated with separation between left and right portions thereof for clarity.
Figure 23A:
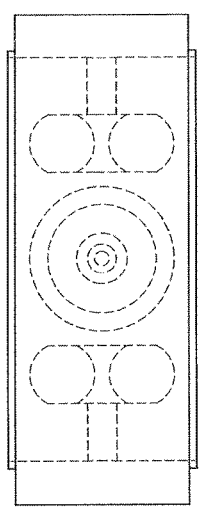
FIG. 23a is a portion of the rotating assembly as in FIG. 21, illustrating a second plurality of levitation rotational magnets.
Figure 23B:
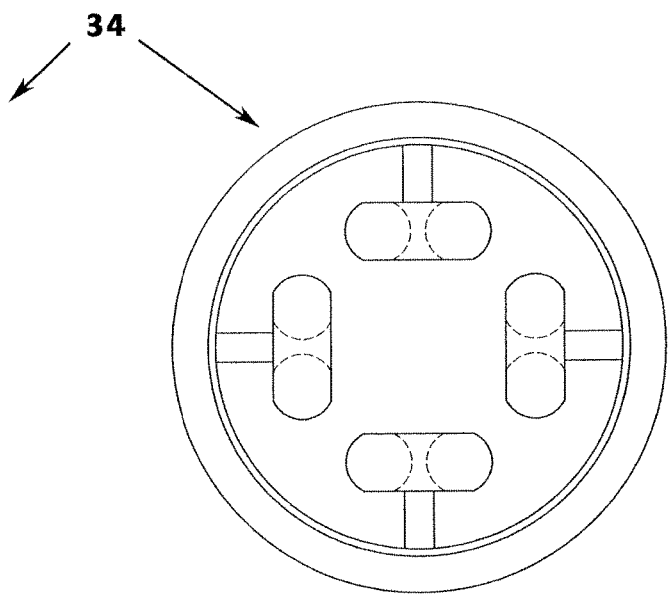
Figures 26A, 26B:
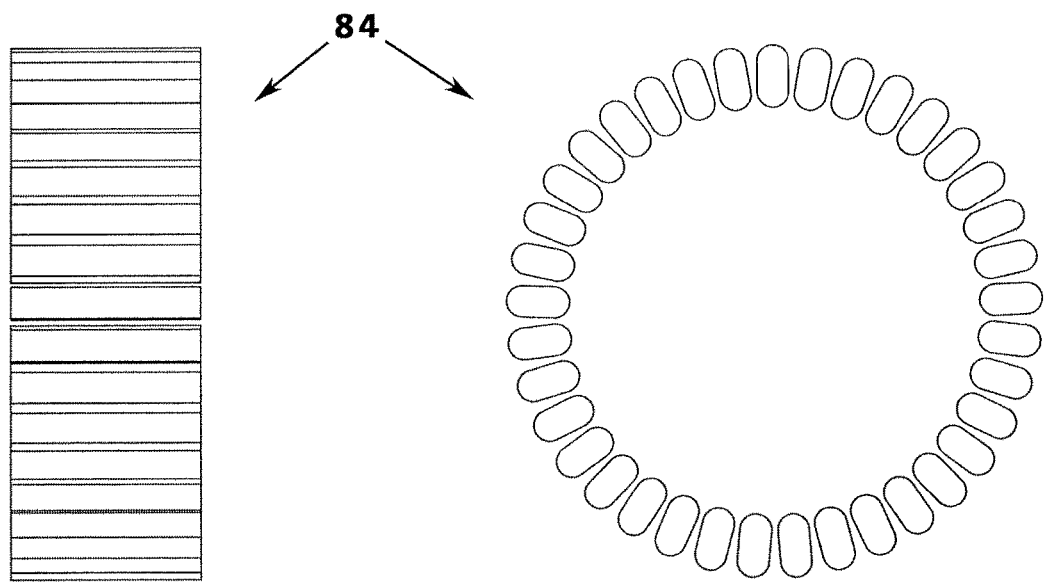

The rotating assembly 40 is illustrated with the casing removed for the sake of clarity in FIG. 20. Preferably, the first plurality of rotating levitation magnet members 42 is positioned in alignment with the first plurality of stationary levitation magnet members 24, respectively, so that the magnetic polarity of each plurality of magnets repels the other, i.e. according to the physical property that magnets of the same polarity repel one another. In practical operation, the first end 41 of the casing of the rotating assembly 40 is held in magnetic levitation in the entrance channel 23 of the housing of the first stationary end case assembly 20.

An identical structure and function exists with reference to the second end 44 of the rotating assembly 40 and the second end stationary case assembly 26. Namely, the second end stationary case assembly 26 includes a second housing having a closed outer end wall 27, an interior wall opposite said outer end wall 27, a continuous side wall 28 extending between said outer end wall 27 and said interior wall, and defines an interior area. The interior wall defines an opening to an entrance channel into which a respective end of the rotating assembly 40 will be received as will be described later.

Again, it is reiterated that the second end stationary case assembly 26 has a construction that is a mirror image of that of the first end stationary case assembly 20 to the extent that not every identical structure is shown or numbered again. More particularly, the second end stationary case assembly 26 includes a second plurality of stationary levitation magnet members 25 positioned and spaced apart in a radial arrangement about the entrance channel of the second end stationary case assembly 26. Each magnet of the second plurality of stationary levitation magnet members has the same magnetic polarity, such a "north" polarity. Specific components of the second plurality of stationary levitation magnet members 25 is the same as like components of the first plurality of stationary levitation magnet members 24 described previously.

Correspondingly, the second end 44 of the rotating assembly 40 includes a second plurality of rotating levitation magnet members 45 positioned inside the casing of the rotating assembly 40 adjacent the second end 44 thereof, each one of the second plurality of rotating levitation magnet members 45 having the same magnetic polarity and that is the same polarity as each one of the second plurality of stationary levitation magnet members 25, e.g. a north polarity.

Preferably, the second plurality of rotating levitation magnet members 45 is positioned in alignment with the second plurality of stationary levitation magnet members 25, respectively, so that the magnetic polarity of each plurality of magnets repels the other, i.e. according to the physical property that magnets of the same polarity repel one another. In practical operation, the second end 44 of the casing of the rotating assembly 40 is held in magnetic levitation in the entrance channel of the housing of the second stationary end case assembly 26.

The first plurality of stationary levitation magnet members 24 is configured to regulate an axial alignment of the first end 41 of the rotating assembly 40. More particularly, each one of the first plurality of stationary levitation magnet members 24 includes a magnet having a ring shaped configuration, a closed face 24a, and a coil 24b operably coupled to the closed face 24a (FIG. 4b), and includes a torroidal transformer 24c surrounding the coil. Correspondingly, each one of the first plurality of rotating levitation magnet members 42 includes a magnet, a coil 43 operably coupled to the magnet, and a torroidal transformer surrounding the coil 43. The important aspect here is the coil's attachment to the closed face 24a and corresponding structures on the first end 41 of the rotating assembly 40—the combination thereof creating the desired axial alignment.

The second plurality of stationary levitation magnet members 25 (FIG. 27b) and the corresponding second plurality of rotating levitation magnet members 45 (FIG. 27b) include the same construction as the first plurality of stationary levitation magnet members 24 (including sub-elements 24a, 24b, and 24c) and corresponding first plurality of rotating levitation magnet members 42 described in the paragraphs above but are unnumbered for clarity.

Figure 4A:
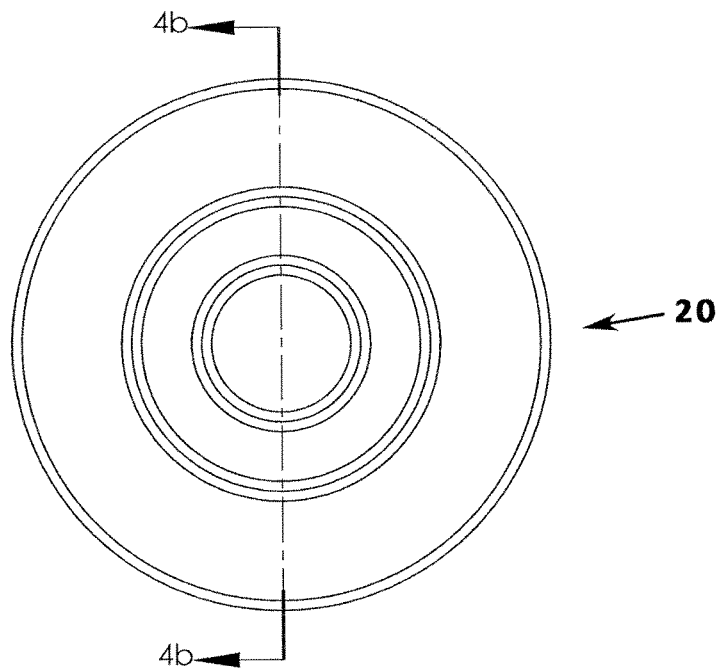
FIG. 4a is an end view of the end stationary case as in FIG. 3.
Figure 4B:
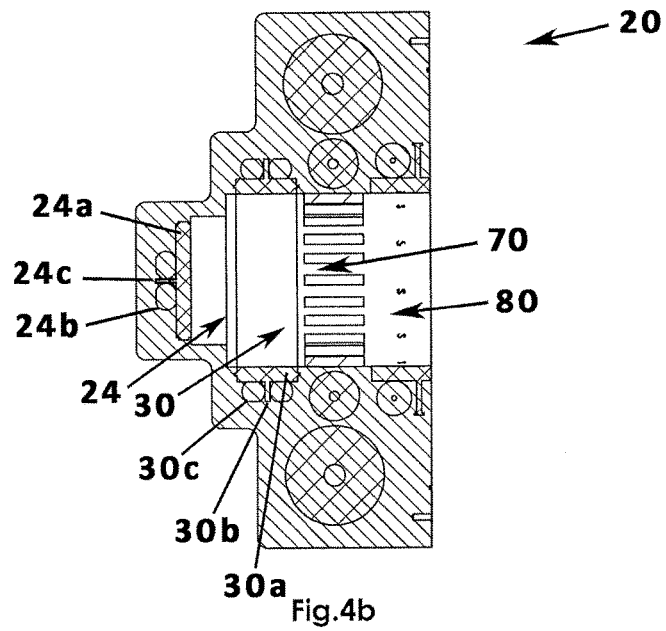

In a manner substantially similar to the axial alignment components described above, the present invention includes structures to regulate a proper vertical or radial alignment of each end of the rotating assembly 40 relative to respective end stationary case assemblies. As will be understood below, components of auxiliary stationary magnet members are positioned differently relative to corresponding auxiliary rotational magnet members so as to establish vertical alignment (rather than axial alignment). More particularly, the first end stationary case assembly 20 includes a first plurality of auxiliary stationary levitation magnet members 30 positioned radially about the entrance channel 23 of the first housing thereof. The first plurality of auxiliary stationary levitation magnet members 30 are immediately adjacent the first plurality of stationary levitation magnet members 24 described above. Again, each one of the first plurality of auxiliary stationary levitation magnet members 30 may include the same polarity, such as a north polarity. With further particularity, each one of the first plurality of auxiliary stationary levitation magnet members 30 may include a ring-shaped magnet 30*a*, a coil 30*b* operably coupled to an outer surface of the corresponding magnet 30*a*, and have a torroidal transformer 30*c* surrounding the corresponding coil 30*b* (FIG. 4*b*).

Then, correspondingly, the first end 41 of the casing of the rotating assembly 40 includes a first plurality of auxiliary rotating levitation magnet members 34 positioned inside the casing. Each one of the first plurality of auxiliary rotating levitation magnet members 34 includes the same polarity as that of each magnet of the first plurality of auxiliary rotating levitation magnet members 30, i.e. a north polarity. The first plurality of auxiliary rotating levitation magnet members 34 is aligned in the assembled invention with and laterally adjacent to and yet slightly displaced from the first plurality of auxiliary stationary levitation magnet members 30, respectively, such that respective magnets along a vertical axis repel or push against one another.

Corresponding to the second stationary case assembly 26 and the second end 44 of the rotating assembly 40, a second plurality of auxiliary stationary levitation magnet members 30' and a corresponding second plurality of auxiliary rotating levitation magnet members 34' are included, these structures including an identical construction as the first plurality of auxiliary stationary levitation magnet members 30 and corresponding first plurality of auxiliary rotating levitation magnet members 34 described in the paragraphs above, including associated magnets, coils, and transformers. Accordingly, primed reference numerals will be used here and in respective accompanying drawings to indicate like components.

So far, the description has been directed to alignment of the rotating assembly 40 in the end case stationary assemblies, respectively. Now, attention will be turned to aspects of the invention designed to generate power, i.e. electricity. First, the rotating assembly 40 must be rotated as revolutions of magnet/coil combinations are known to generate electricity. A plurality of rotational magnets 48 extend away from an outer surface of the rotating assembly 40 in a radially spaced apart configuration and are positioned about midway between the first end 41 and second end 44 of the casing of the rotating assembly 40. Each rotational magnet 48 has the same polarity, such as a north polarity.

Correspondingly, the center stationary case assembly 50 has a ring-shaped configuration having side walls 56 that extend between an inner surface and an outwardly concentric outer surface 55. Together, the inner surface, outer surface, and side walls 56 define an interior area. The inner surface 54 defines an axial throughbore through which the casing of the rotating assembly 40 extends so that respective magnetic components may interact during rotation of the rotating assembly 40 as will be described below (FIG. 11, et seq). A plurality of center magnets 51 is spaced apart along the inner surface 54 of the center case housing 52, each center magnet having the same polarity and a polarity that is the same and therefore opposed to a polarity of a plurality of rotational magnets described above. In addition, each center magnet 51 may have offset sides and have a generally V-shaped configuration so as to be aligned with the plurality of rotational magnets 48 of the rotating assembly 40 described above. The plurality of center magnets 51 and plurality of rotational magnets 48 are appropriately aligned so that the magnets repel one another—causing the rotating assembly 40 to rotate in the nature of an axle. The rotation thereof causes predetermined magnet/coil combinations to interact and, a result, to produce electricity as will be described in more detail later.

The center stationary case assembly 50 has a center stationary case housing 52 which may be referred to as having a doughnut or ring-shaped configuration, having an outer surface 55 concentric with the aforementioned inner surface 54. The center stationary case housing 52 may include side walls 56 that, together with the inner and outer surfaces define the interior space. Intermediate the inner and outer surfaces within the interior area of the center stationary case assembly 50 is an inner ring 60 that interacts with the rotating assembly 40 so that electricity is generated and also includes a mechanism for actuating between a running (rotating) mode and an at-rest or stopped mode as will be described later. The inner ring 60 is concentric to the inner surface 54 and outer surface 55. More particularly, the inner surface 54 of the housing 52 of the center stationary case assembly 50 defines a plurality of windows 57. The windows 57 are spaced apart from one another and are dimensioned to allow respective magnet covers 66 having a magnetic attraction of their own to be drawn through respective windows 57 when the inner ring 60 is rotated appropriately as will be described below.

Figure 16A:
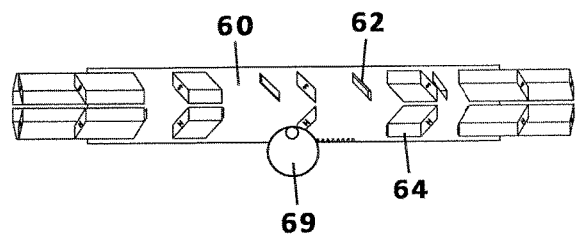
FIG. 16a is another top view of the stationary case assembly removed from FIG. 2 and illustrated with an outer casing and with coils and magnet covers removed for clarity.
Figure 16B:
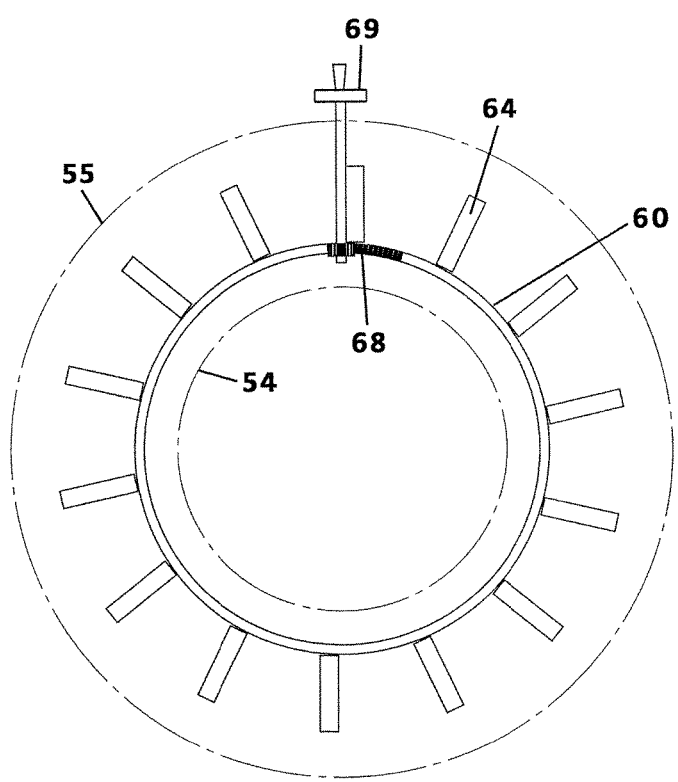
FIG. 16b is a front view of the assembly of FIG. 16a, illustrated with inner and outer surface of a casing in dashed lines for context.
Figure 16C:
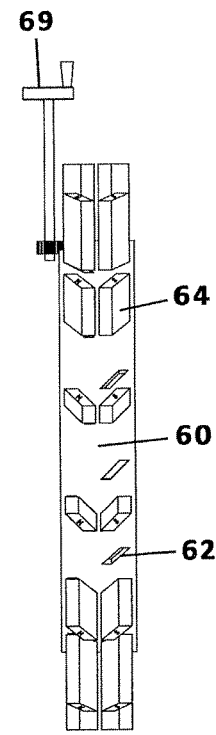
FIG. 16c is an end view of the assembly of FIG. 16b.

A plurality of actuation magnets 64 extend outwardly from an outward side of the inner ring 60, the plurality of actuation magnets being arranged in pairs with each pair being offset (at different angles) relative to one another (FIGS. 16*a* to 16*c*). It is understood that of each pair of actuation magnets, one has a north polarity and one has a south polarity. It is respective actuation magnets that will cause slidable movement of respective magnet covers 66 and, as a result, cause rotation of the rotating assembly 40 to start or stop as will be described more fully below.

A plurality of magnet covers 66 is positioned in the interior area of the center stationary case housing 52 intermediate an inner surface of the inner ring 60 and the inner surface 54 of the center stationary case assembly 50 (FIGS. 14*a* to 16*c*). Each magnet cover 66 is associated with a corresponding actuation magnet 64 and is slidable toward or away from the inner ring 60 when either repelled or attracted by a complementary actuation magnet 64, respectively.

Figure 17:
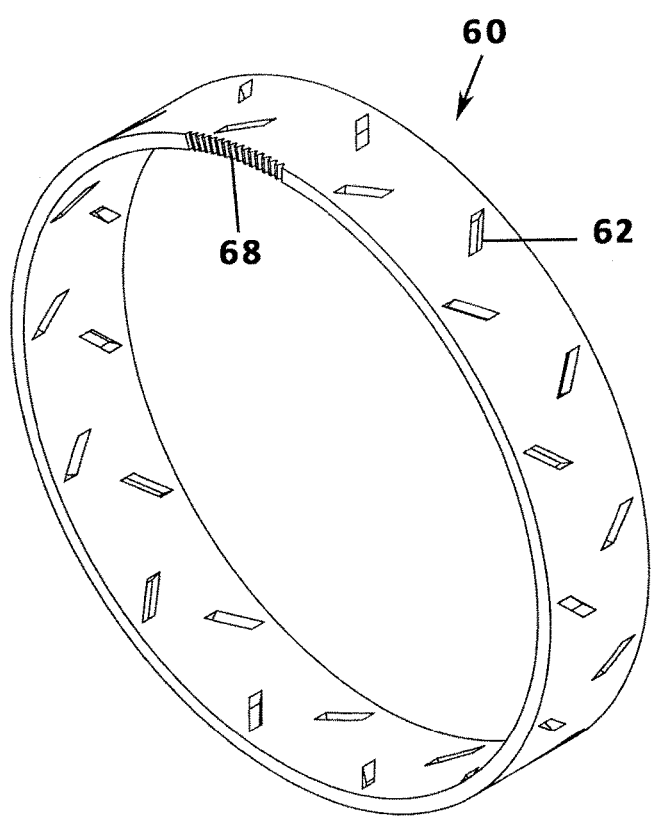
FIG. 17 is a perspective view of the inner ring of the center stationary case with housing and all magnets removed so as to illustrate how rotation thereof enables toggling between operating and stop configurations.
Figure 18:
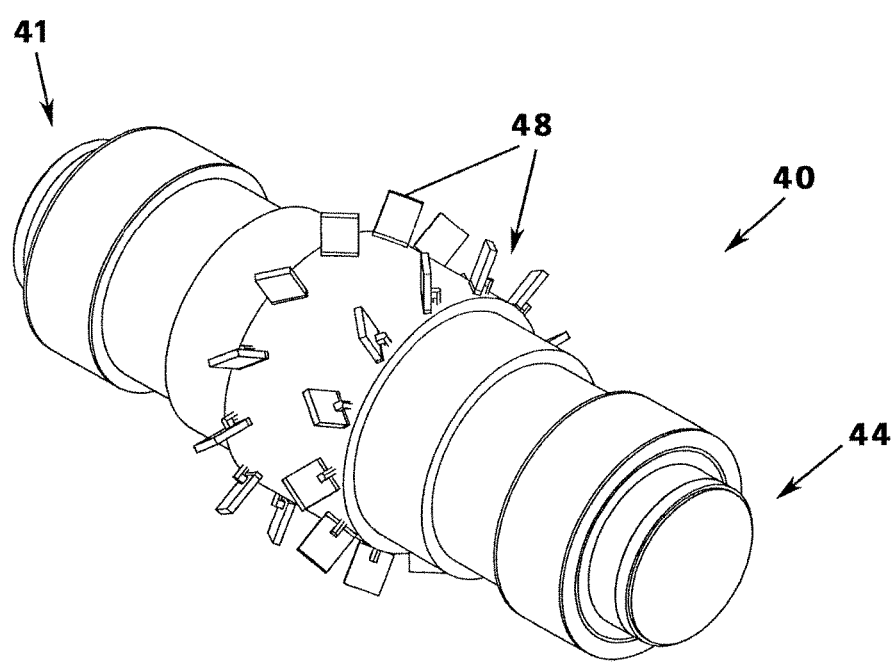
FIG. 18 is a perspective view of the rotating assembly taken from FIG. 2.
Figure 19A:
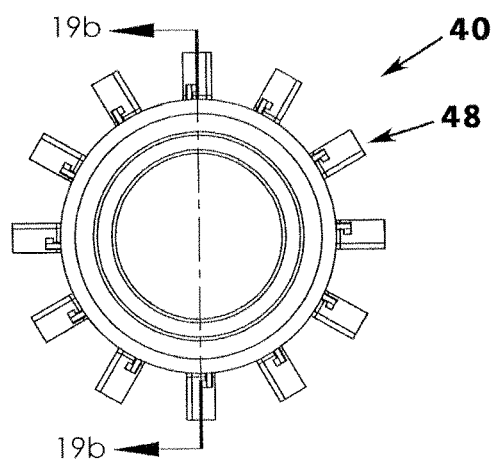
FIG. 19a is an end view of the rotating assembly as in FIG. 18.
Figure 19B:
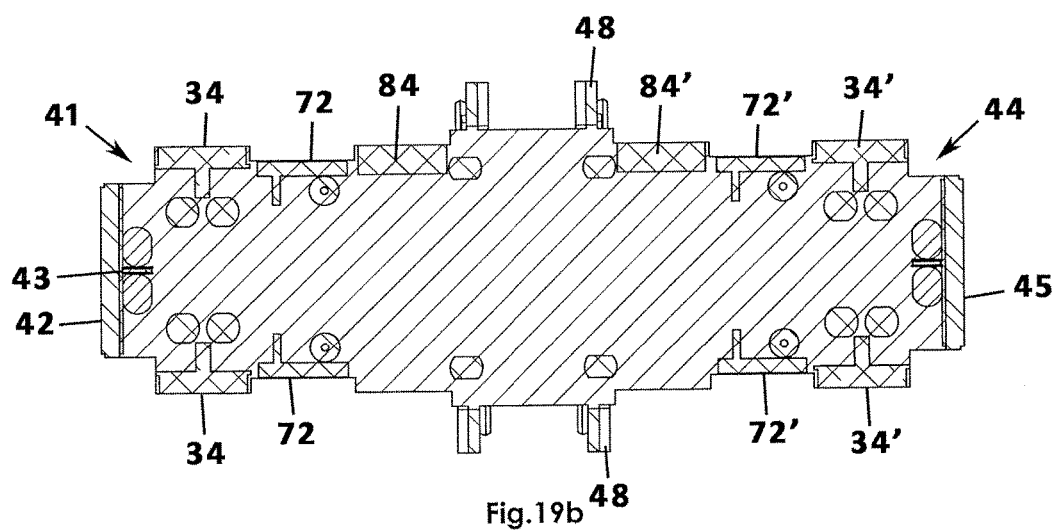

Rotation of the inner ring 60 such that rotation of the rotating assembly 40 is caused to either start or stop will now be described further. The inner ring 60 includes gear teeth 68 along an upper edge thereof (FIG. 17). The gear teeth 68 may be an actual gear component or be molded into the edge of the inner ring 60 during manufacture. It will be appreciated that the inner ring 60 may be rotatably mounted within the interior area defined by the center case housing 52 of the center stationary case assembly 50. Further, the center stationary case assembly 50 includes a controller, such as a control knob 69 coupled to a linkage that is in operable communication with the gear teeth 68 such that a manual operation of the control knob 69 actuates the gear teeth 68 to rotate the inner ring 60 of the center case housing 52 a predetermined amount. Preferably, operation of the controller is gradual and incremental so that rotational operation of the magnetic generator 10 is not started or stopped abruptly, which may cause damage. In other embodiments, the control knob 69 may be operated vertically and the linkage configured to engage the gear teeth 68 and rotate the inner ring 60 in the manner of rack-and-pinion gear mechanisms.

The inner ring 60 defines a plurality of slots 62 adjacent respective actuation magnets 64, each of the plurality of slots 62 being offset laterally from an adjacent slot and spaced apart (FIG. 17). When the inner ring 60 is rotated (by operation of the control knob 69 and gear teeth 68), the slots 62 will allow respective magnetic forces of respective actuation magnets 64 to either pull or push a respective magnet cover 66 to cover or reveal a respective center magnet 51, respectively.

Figure 12A:
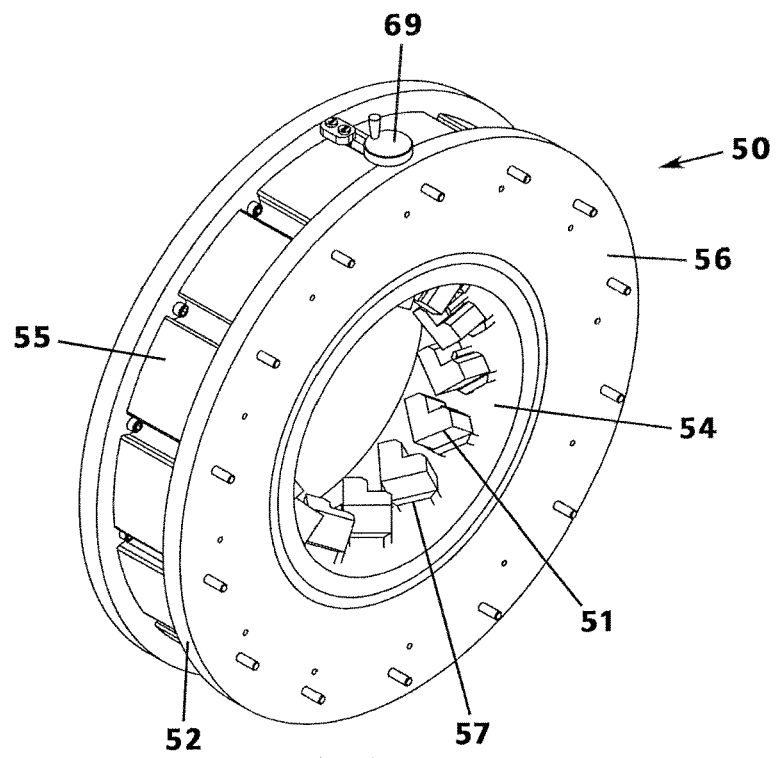
FIG. 12a is an isolated perspective view of a center stationary case assembly taken from FIG. 2, illustrated with the plurality of magnet covers in deployed configurations, respectively.
Figure 12B:
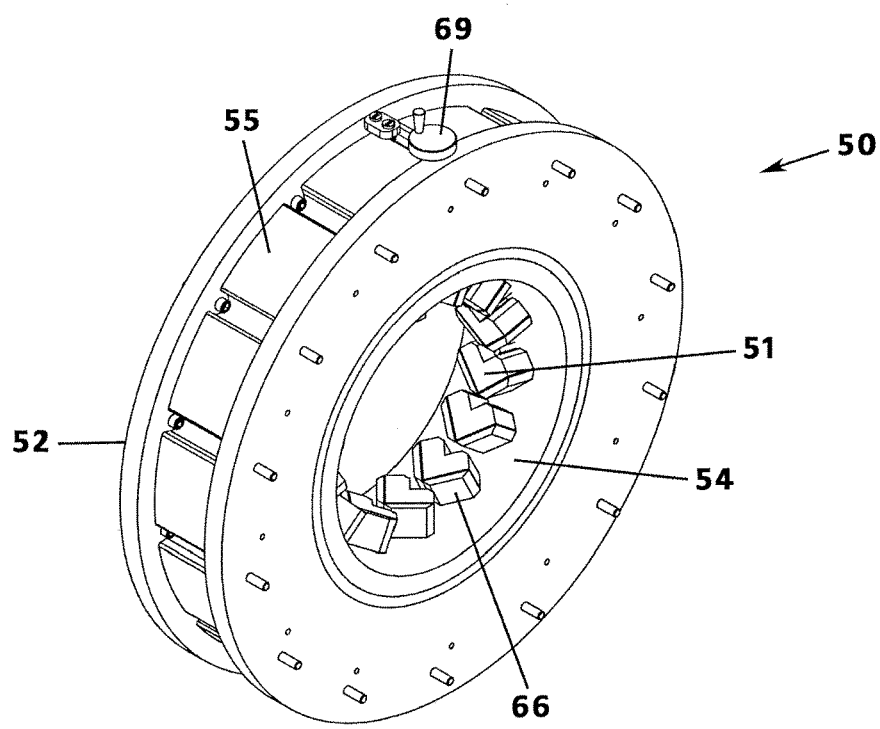
FIG. 12b is an isolated perspective view of a center stationary case assembly taken from FIG. 2, illustrated with the plurality of magnet covers in retracted configurations, respectively.
Figure 13A:
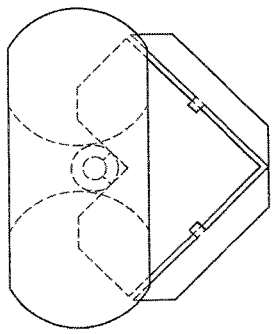
FIG. 13a is a plan view of a magnet and magnet cover combination according to the center stationary case assembly.
Figure 13B:
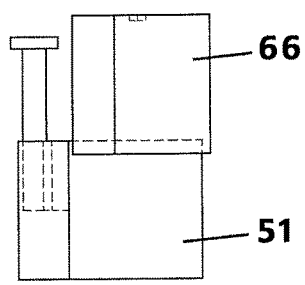
FIG. 13b is a side view of the magnet and magnet cover combination as in FIG. 13a illustrated in an uncovered configuration.
Figure 13C:
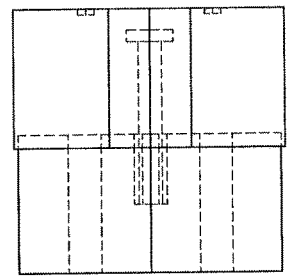
FIG. 13c is a side view taken from another angle as in FIG. 13b.
Figure 14A:
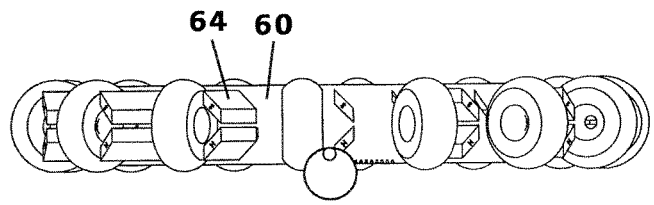
FIG. 14a is a top view of the stationary case assembly removed from FIG. 2 and illustrated with an outer casing removed for clarity.
Figure 14B:
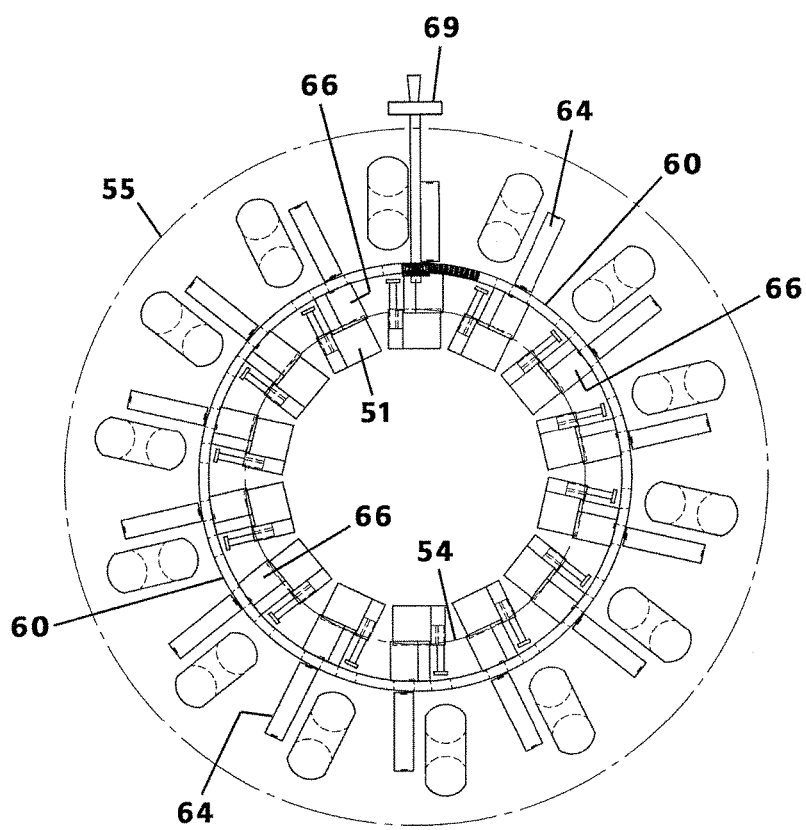
FIG. 14b is a side view of the stationary case assembly showing operation of a plurality of center magnets and magnet covers in an operating configuration, illustrated with inner and outer surface of a casing in dashed lines for context.
Figure 14C:
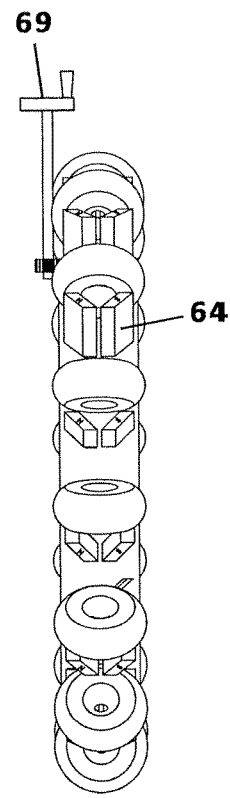
FIG. 14c is a view taken from a different angle of the stationary case assembly in the operating configuration.
Figure 15A:
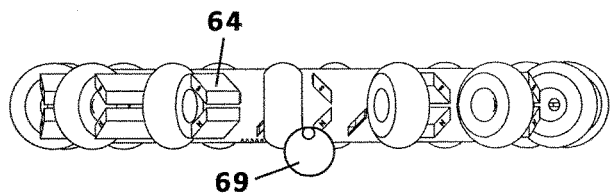
FIG. 15a is a top view of the stationary case assembly removed from FIG. 2 and illustrated with an outer casing for clarity.
Figure 15B:
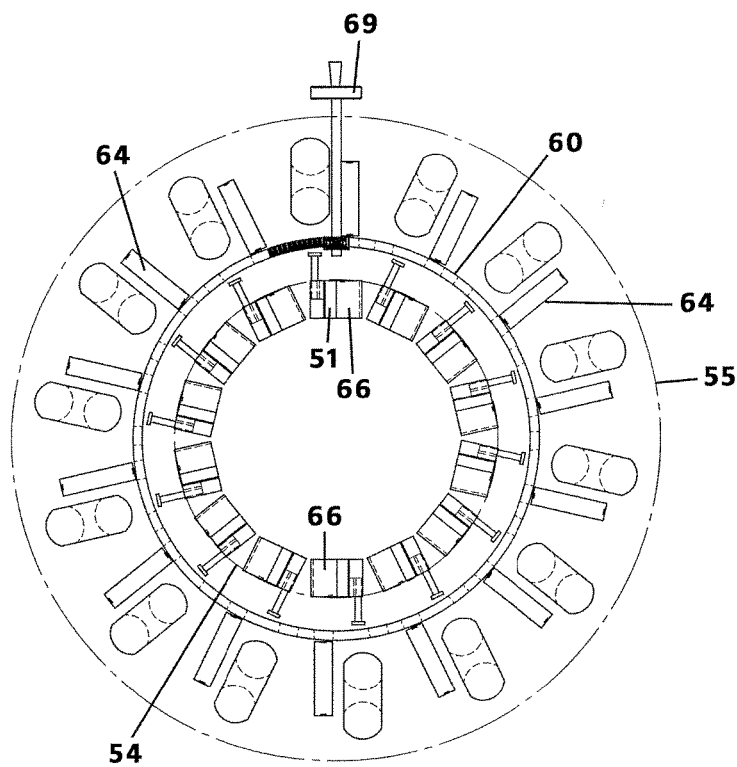
FIG. 15b is a side view of the stationary case assembly showing operation of a plurality of center magnets and magnet covers in stopped configuration, illustrated with inner and outer surface of a casing in dashed lines for context.
Figure 15C:
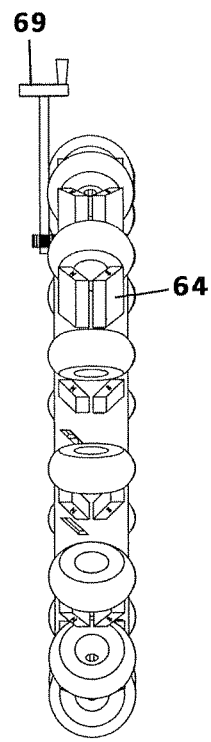
FIG. 15c is a view taken from a different angle of the stationary case assembly in the stopped configuration.

In use, the inner ring 60 may be rotated until respective slots 62 are aligned with respective center magnets of the plurality of center magnets 51, respectively. In one direction of rotation, the windows allow magnetic attraction to cause respective magnet covers 66—such as those having a south polarity—to be pulled outwardly toward the corresponding attracting actuation magnets 64, allowing the rotating assembly 40 to rotate as described above (FIGS. 12*a* and 15*b*). Conversely, when the slots 62 in a parallel track are aligned with corresponding center magnets 51, the windows allow magnetic attraction to cause respective magnet covers—such as those having a north polarity—to slide down over respective center magnets 51, causing the rotating assembly 40 to stop rotating (FIGS. 12*b* and 14*b*). A described above, respective magnet covers slide through respective windows 57 of the inner surface 54 and then alongside and attracted to respective center magnets 51. To be clear, when a center magnet 51 is covered by a magnet cover 66, the magnetic force for repelling corresponding rotational magnets of the rotating assembly 40 is blocked and rotation is prevented.

In summary, rotation of the inner ring 60 correspondingly rotates the offset slots 62 and allows magnets of one polarity or another to attract or repel corresponding magnet covers 66 to extend through respective windows 57 of the inner surface 54 of the center stationary case assembly 50—effectively allowing or preventing rotation of the rotating assembly 40. The control knob 69 acts as an on/off toggle. A comparison of FIGS. 14*a* to 15*c* illustrates this action.

Having now described alignment of the rotating assembly 40 in the end case stationary assemblies, respectively, and the rotational operation of the rotating assembly 40 so as to generate power, attention will be given to the power generation capabilities of the present invention. First (and as described previously), the first plurality of stationary levitation magnet members 24, second plurality of stationary levitation magnet members 25, first plurality of auxiliary stationary levitation magnet members 30, second plurality of auxiliary stationary levitation mounting members 30', and all of the corresponding and aligned rotating levitation member of the rotating assembly 40 include magnets, coils, and toroidal transformer components capable of generating electricity when the rotating assembly 40 is actuated by operation of the control knob 69 and inner ring 60.

Next, each end stationary case may include at least one but preferably more than one stationary enhanced power generation assembly 70 having a plurality of spaced apart magnets with corresponding coils and transformers (FIGS. 4*b*, and 5*a* to 5*c*). It should be noticed that all portions of this assembly (overall view, specific view of the coils, and specific view of the transformers) are all properly referred to by the common reference numeral 70 (see FIGS. 4*b*, 5*a* to 5*c*, FIG. 8, FIG. 9, and FIGS. 10*a* to 10*c*). It will be understood that the purpose of the coils of the power generation assembly 70 is to supply electricity to the stationary levitation magnet members 24 and 25 described above. Correspondingly, the rotating assembly 40 may include at least one but preferably more than one rotating enhanced power generation assembly 72 with corresponding coils and transformers (FIGS. 20, 25*a* to 25*c*, and 26*a* to 26*b*). It can be seen that the plurality of magnets associated with the rotating enhanced power generation assembly 72 are arranged in an alternating pattern of north and south polarity so as to generate electricity when rotated. Corresponding structures in the second stationary case assembly 26 and proximate the second end 44 of the rotating assembly 40 are indicated with primed numerals 70' and 72', respectively. In fact, the present invention may include multiple corresponding pluralities of magnets, coils, and transformers positioned to generate electricity upon rotation of the rotating assembly 40.

Even more specifically, the first end stationary case assembly 20 may further include another power generation assembly 80 having a plurality of magnets of alternating (N-S) polarities (FIG. 4*b*, FIGS. 11*a* to 11*d*). This same structure is referenced as another power generation assembly 80' in the second stationary case assembly 26 in FIG. 27*b*. It will be understood that power generation assembly 80 creates the alternating electrical current for the rotating assembly assemblies which will be described later. In other words, the magnets described in this paragraph interact with coils of the rotating assembly assemblies to create electricity so as to lengthen and strengthen their performance and make the current invention a more powerful machine. Namely, the rotating assembly 40 includes a plurality of coils 84, 84' that interact with power generation assembly 80 for generating electricity.

Figure 27C:
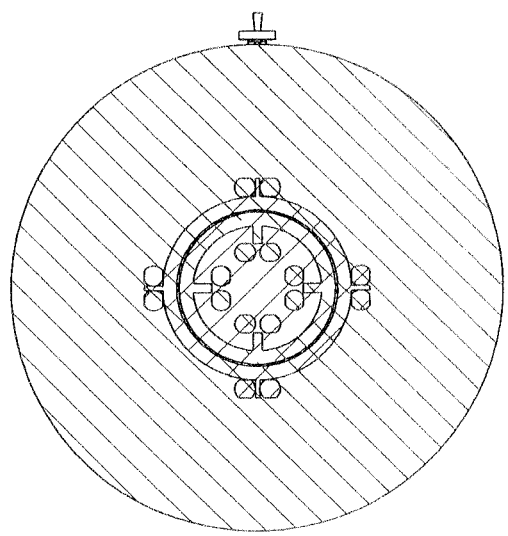
FIG. 27c is a sectional view taken along line 27c-2cb of FIG. 27b.
Figure 27D:
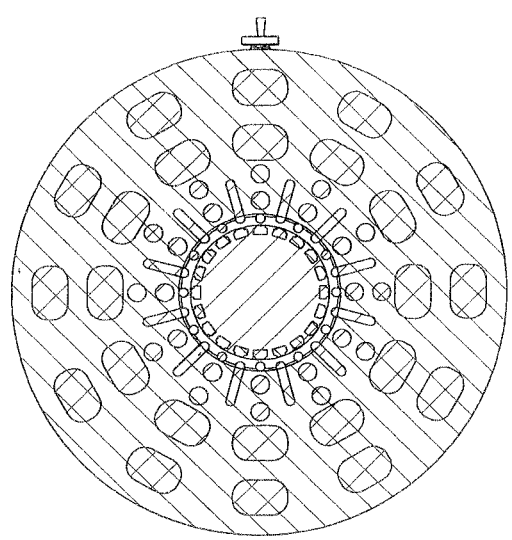
FIG. 27d is a sectional view taken along line 27d-27d of FIG. 27b.
Figure 27E:
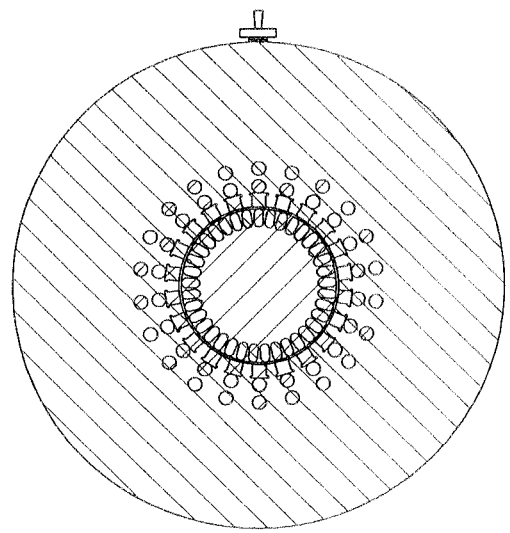
FIG. 27e is a sectional view taken along line 27e-27e of FIG. 27b.
Figure 27F:
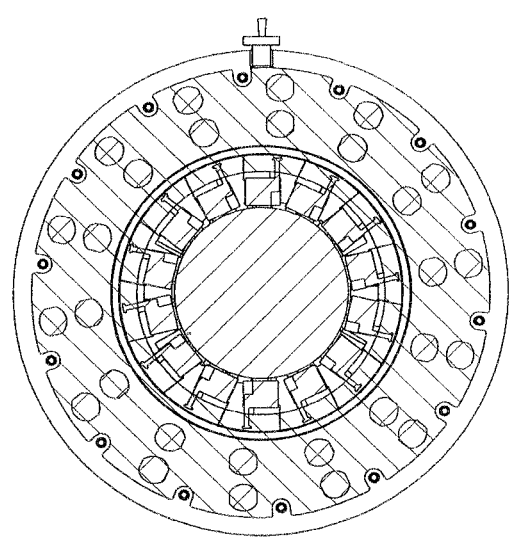
FIG. 27f is a sectional view taken along line 27f-27f of FIG. 27b.

FIG. 27*b* illustrates operation of the device in its entirety and is especially important to show the intended alignment of component parts described above. This figure is also useful to summarize that the rotating assembly 40 extends between the first end stationary case assembly 20 and the second end stationary case assembly 26 and rotates therein. The center stationary case assembly 50 is bolted and sandwiched between the first end stationary case assembly 20 and the second end stationary case assembly 26 and encircles the rotating assembly 40 according to operation of the control knob 69 as described above. It is understood that electricity generated by the described apparatus may be stored in a battery or used immediately in real time.

It is understood that while certain forms of this invention have been illustrated and described, it is not limited thereto except insofar as such limitations are included in the following claims and allowable functional equivalents thereof.

The invention claimed is:
1. A magnetic generator, comprising:
 a first end stationary case assembly that includes a first housing defining an entrance channel and that includes a first plurality of stationary levitation magnet members positioned radially about said entrance channel, each of said first plurality of stationary levitation magnet members of said first end stationary case assembly having a north polarity;
 a rotating assembly that includes a casing having a first end in operable communication with said entrance channel of said first housing of said first stationary case assembly and a second end opposite said first end;
 wherein said first end of said rotating assembly includes a first plurality of rotating levitation magnet members positioned inside said casing, each one of said first plurality of rotating levitation magnet members having a north polarity;

wherein said first plurality of rotating levitation magnet members are aligned with and adjacent to said first plurality of stationary levitation magnet members, respectively, so that said first end of said rotating assembly is held in a magnetically induced levitation position relative to said entrance channel of said first housing;

a plurality of rotational magnets extending away from an outer surface of said rotating assembly between said first and second ends thereof;

a center stationary case assembly that includes a center case housing having a ring-shaped configuration defining an interior area and having an inner surface defining an axial throughbore through which said casing of said rotating assembly extends, said inner surface defining a plurality of spaced apart windows; and a plurality of center magnets spaced apart along said inner surface adjacent said plurality of windows, respectively, and that are aligned with said plurality of rotational magnets of said rotating assembly;

wherein each center magnet includes a polarity matching that of said plurality of rotational magnets, respectively, such that said rotating assembly is caused to rotate axially by a repelling force caused by proximate contact of said plurality of rotational magnets and said plurality of said center magnets.

2. The magnetic generator as in claim 1, further comprising:

a second end stationary case assembly that includes a second housing defining an entrance channel for receiving said second end of said rotating assembly and that includes a second plurality of stationary levitation magnet members positioned radially about said entrance channel of said second housing, each of said second plurality of stationary levitation magnet members of said second end stationary case assembly having a north polarity;

wherein said second end of said rotating assembly includes a second plurality of rotating levitation magnet members positioned inside said casing, each one of said second plurality of rotating levitation magnet members having a north polarity;

wherein said second plurality of rotating levitation magnet members is aligned with and adjacent to said second plurality of stationary levitation magnet members, respectively, so that said second end of said rotating assembly is held in a magnetically induced levitation position relative to said entrance channel of said second housing.

3. The magnetic generator as in claim 2, wherein:

each one of said first plurality of stationary levitation magnet members includes a magnet having a ring-shaped configuration and having a closed face, a coil operably coupled to said closed face of said magnet, and a torroidal transformer surrounding said coil;

each one of said first plurality of rotating levitation magnet members includes a magnet, a coil operably coupled to the magnet, and a torroidal transformer surrounding said coil;

each one of said second plurality of stationary levitation magnet members includes a magnet, a coil operably coupled to a face of said magnet, and a torroidal transformer surrounding said coil;

each one of said second plurality of rotating levitation magnet members includes a magnet, a coil operably coupled to an outer ring surface of said magnet, and a torroidal transformer surrounding said coil.

4. The magnetic generator as in claim 2, wherein:

said first end stationary case assembly includes a first plurality of auxiliary stationary levitation magnet members positioned radially about said entrance channel and adjacent to said plurality of stationary levitation magnet members, each of said first plurality of auxiliary stationary levitation magnet members of said first end stationary case assembly having a north polarity;

each one of said first plurality of auxiliary stationary levitation magnet members includes a magnet having a ring-shaped configuration, a coil operably coupled to an outer surface of said magnet, and a torroidal transformer surrounding said coil;

said first end of said rotating assembly includes a first plurality of auxiliary rotating levitation magnet members positioned inside said casing, each one of said first plurality of auxiliary rotating levitation magnet members having a north polarity;

said first plurality of auxiliary rotating levitation magnet members is aligned with and adjacent to said first plurality of auxiliary stationary levitation magnet members, respectively, so that said first end of said rotating assembly is held in a magnetically induced levitation position relative to said entrance channel of said first housing.

5. The magnetic generator as in claim 4, wherein:

said second end stationary case assembly includes a second plurality of auxiliary stationary levitation magnet members positioned radially about said entrance channel and adjacent to said plurality of stationary levitation magnet members, each of said second plurality of auxiliary stationary levitation magnet members of said second end stationary case assembly having a north polarity;

each one of said second plurality of auxiliary stationary levitation magnet members includes a magnet having a ring-shaped configuration, a coil operably coupled to an outer surface of said magnet, and a torroidal transformer surrounding said coil;

said second end of said rotating assembly includes a second plurality of auxiliary rotating levitation magnet members positioned inside said casing, each one of said second plurality of auxiliary rotating levitation magnet members having a north polarity;

said second plurality of auxiliary rotating levitation magnet members is aligned with and adjacent to and yet displaced from said second plurality of auxiliary stationary levitation magnet members, respectively, so that said second end of said rotating assembly is held in a magnetically induced levitation position relative to said entrance channel of said second housing.

6. The magnetic generator as in claim 1, wherein:

said first end stationary case assembly includes a first plurality of stationary power magnets embedded in said first housing and spaced apart radially about said entrance channel thereof, each of said first plurality of stationary power magnets having a north polarity;

said rotating assembly includes a first plurality of power generation magnets positioned inside said casing adjacent said plurality of auxiliary rotating levitation magnet members, said first plurality of power generation magnets being in alignment with yet displaced from said first plurality of stationary power magnets, respectively.

7. The magnetic generator as in claim 2, wherein:

said second end stationary case assembly includes a second plurality of stationary power magnets embedded in said second housing and spaced apart radially about said entrance channel thereof, each of said second plurality of stationary power magnets having a north polarity;

said rotating assembly includes a second plurality of power generation magnets positioned inside said casing adjacent said second plurality of auxiliary rotating levitation magnet members, said second plurality of power generation magnets being in alignment with said second plurality of stationary power magnets, respectively.

8. The magnetic generator as in claim 1, wherein said rotating assembly further comprises:

a first plurality of auxiliary rotational magnets mounted axially inside said casing of said rotating assembly adjacent said plurality of rotational magnets, each one of said first plurality of auxiliary rotational magnets being associated with a coil and having a same polarity as every other one of said plurality of auxiliary rotational magnets;

a second plurality of auxiliary rotational magnets mounted axially inside said casing of said rotating assembly adjacent said plurality of said first plurality of auxiliary rotational magnets, respectively, each one of said second plurality of auxiliary rotational magnets having an opposite polarity to each adjacent one of said second plurality of auxiliary rotational magnets.

9. The magnetic generator as in claim 1, wherein said center stationary case assembly includes:

an inner ring positioned in said interior space that is intermediate and concentric to said outer surface and said inner surface, said inner ring defining a plurality of slots and being rotatable between a run configuration and a stop configuration;

a plurality of actuation magnets extending outwardly from said inner ring proximate said plurality of slots, respectively, said plurality of actuation magnets being arranged as pairs of actuation magnets wherein a first magnet of a respective pair of actuation magnets has a north polarity and a second magnet of said respective pair of actuation magnets has a south polarity;

a plurality of magnet covers positioned in said interior space proximate said plurality of center magnets and said plurality of windows and said plurality of actuation magnets, respectively, each of said plurality of magnet covers having a north polarity;

wherein said plurality of magnet covers is slidable through said plurality of windows to shield said plurality of actuation magnets, respectively, at said stop configuration and is displaced from said plurality of said actuation magnets, respectively, at said run configuration.

10. The magnetic generator as in claim 9, wherein said center stationary case assembly includes a controller operably coupled to said inner ring for rotating said inner ring between said stop configuration and said run configuration.

11. The magnetic generator as in claim 10, wherein:

said inner ring includes a plurality of gear teeth;

said controller is a control knob operably coupled to said gear teeth via a linkage such that a rotation of said control knob causes a rotary movement of said inner ring.

12. The magnetic generator as in claim 11, wherein:

at said run configuration, respective slots are aligned with respective magnet covers and respective said second magnets of said respective pair of actuation magnets such that said respective magnet covers are attracted magnetically toward respective said second magnets of said respective pair of actuation magnets, whereby said plurality of center magnets are allowed to repel said plurality of rotational magnets of said rotating assembly;

at said stop configuration, respective slots are aligned with respective magnet covers and respective said first magnets of said respective pair of actuation magnets such that said respective magnet covers are repelled magnetically away from respective said first magnets of said respective pair of actuation magnets, whereby said plurality of center magnets are shielded and unable to repel said plurality of rotational magnets of said rotating assembly.

13. The magnetic generator as in claim 9, wherein:

at said run configuration, respective slots are aligned with respective magnet covers and respective said second magnets of said respective pair of actuation magnets such that said respective magnet covers are attracted magnetically toward respective said second magnets of said respective pair of actuation magnets, whereby said plurality of center magnets are allowed to repel said plurality of rotational magnets of said rotating assembly;

at said stop configuration, respective slots are aligned with respective magnet covers and respective said first magnets of said respective pair of actuation magnets such that said respective magnet covers are repelled magnetically away from respective said first magnets of said respective pair of actuation magnets, whereby said plurality of center magnets are shielded and unable to repel said plurality of rotational magnets of said rotating assembly.

14. The magnetic generator as in claim 1, wherein said center stationary case assembly includes:

a plurality of magnet covers positioned in said interior area slidably movable between a (1) run configuration positioned in said interior area and displaced from said plurality of center magnets and (2) a stop configuration extending through said plurality of windows, respectively, so as to shield said plurality of center magnets, respectively, from magnetic interaction with said plurality of rotational magnets, respectively, and, as a result, to stop said rotation of said rotating assembly.

15. The magnetic generator as in claim 1, further comprising:

a second end stationary case assembly that includes a second housing defining an entrance channel for receiving said second end of said rotating assembly and that includes a second plurality of stationary levitation magnet members positioned radially about said entrance channel of said second housing, each of said second plurality of stationary levitation magnet members of said second end stationary case assembly having a north polarity;

wherein said second end of said rotating assembly includes a second plurality of rotating levitation magnet members positioned inside said casing, each one of said second plurality of rotating levitation magnet members having a north polarity;

wherein said second plurality of rotating levitation magnet members is aligned with and adjacent to said second plurality of stationary levitation magnet members, respectively, so that said second end of said rotating assembly is held in a magnetically induced levitation position relative to said entrance channel of said second housing;

wherein said center stationary case assembly includes:
a plurality of magnet covers positioned in said interior area slidably movable between a (1) run configuration positioned in said interior area and displaced from said plurality of center magnets and (2) a stop configuration extending through said plurality of windows, respectively, so as to shield said plurality of center magnets, respectively, from magnetic interaction with said plurality of rotational magnets, respectively, and, as a result, to stop said rotation of said rotating assembly.

16. The magnetic generator as in claim 1, further comprising:
a second end stationary case assembly that includes a second housing defining an entrance channel for receiving said second end of said rotating assembly and that includes a second plurality of stationary levitation magnet members positioned radially about said entrance channel of said second housing, each of said second plurality of stationary levitation magnet members of said second end stationary case assembly having a north polarity;
wherein said second end of said rotating assembly includes a second plurality of rotating levitation magnet members positioned inside said casing, each one of said second plurality of rotating levitation magnet members having a north polarity;
wherein said second plurality of rotating levitation magnet members is aligned with and adjacent to said second plurality of stationary levitation magnet members, respectively, so that said second end of said rotating assembly is held in a magnetically induced levitation position relative to said entrance channel of said second housing;
wherein said center stationary case assembly includes:
an inner ring positioned in said interior space that is intermediate and concentric to said outer surface and said inner surface, said inner ring defining a plurality of slots and being rotatable between a run configuration and a stop configuration;
a plurality of actuation magnets extending outwardly from said inner ring proximate said plurality of slots, respectively, said plurality of actuation magnets being arranged as pairs of actuation magnets wherein a first magnets of a respective pair of actuation magnets has a north polarity and a second magnet of said respective pair of actuation magnets has a south polarity;
a plurality of magnet covers positioned in said interior space proximate said plurality of center magnets and said plurality of windows and said plurality of actuation magnets, respectively, each of said plurality of magnet covers having a north polarity;
wherein said plurality of magnet covers is slidable through said plurality of windows to shield said plurality of actuation magnets, respectively, at said stop configuration and is displaced from said plurality of said actuation magnets, respectively, at said run configuration.

* * * * *